United States Patent
Bala

(10) Patent No.: US 9,632,650 B2
(45) Date of Patent: *Apr. 25, 2017

(54) COMMAND SEARCHING ENHANCEMENTS

(71) Applicant: Microsoft Technology Licensing, LLC, Redmond, WA (US)

(72) Inventor: Aravind Bala, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 744 days.

This patent is subject to a terminal disclaimer.

(21) Appl. No.: 13/732,520

(22) Filed: Jan. 2, 2013

(65) Prior Publication Data

US 2013/0205241 A1  Aug. 8, 2013

Related U.S. Application Data

(63) Continuation of application No. 11/701,125, filed on Feb. 1, 2007, now Pat. No. 8,370,743, which is a continuation-in-part of application No. 11/372,545, filed on Mar. 10, 2006, now Pat. No. 7,925,975.

(51) Int. Cl.
*G06F 3/0481* (2013.01)
*G06F 9/44* (2006.01)

(52) U.S. Cl.
CPC .......... *G06F 3/0481* (2013.01); *G06F 9/4446* (2013.01)

(58) Field of Classification Search
CPC ............................ G06F 9/4446; G06F 17/243
See application file for complete search history.

(56) References Cited

U.S. PATENT DOCUMENTS

| | | |
|---|---|---|
| 5,041,967 A | 8/1991 | Ephrath et al. |
| 5,231,691 A | 7/1993 | Yasuda |
| 5,265,065 A | 11/1993 | Turtle |
| 5,632,002 A | 5/1997 | Hashimoto et al. |
| 5,748,973 A | 5/1998 | Palmer et al. |
| 5,748,974 A | 5/1998 | Johnson |
| 5,799,276 A | 8/1998 | Komissarchik et al. |
| 5,852,801 A | 12/1998 | Hon et al. |

(Continued)

FOREIGN PATENT DOCUMENTS

| | | |
|---|---|---|
| EP | 0503944 A2 | 9/1992 |
| EP | 0317479 B1 | 1/1997 |

(Continued)

OTHER PUBLICATIONS

European Application No. 05107831.9-2211 Article 94(3) EPC dated Nov. 17, 2009, 6 pages.

(Continued)

*Primary Examiner* — Rashawn Tillery
(74) *Attorney, Agent, or Firm* — Christopher J. Volkmann; Kelly, Holt & Christenson, PLLC

(57) ABSTRACT

A user can access a searching component that allows the user to enter search terms to search for commands associated with a computer program. Some specific embodiments pertain to methods for supporting user access to the searching component, to methods for processing search terms submitted by the user, and to methods for guiding the user in terms of their formulation and selection queries. Methods for generating, organizing and manipulating the search results are also provided.

20 Claims, 28 Drawing Sheets

(56) References Cited

U.S. PATENT DOCUMENTS

| | | |
|---|---|---|
| 6,014,138 A | 1/2000 | Cain et al. |
| 6,026,388 A | 2/2000 | Liddy et al. |
| 6,044,347 A | 3/2000 | Abella et al. |
| 6,078,914 A | 6/2000 | Redfern |
| 6,085,159 A | 7/2000 | Ortega et al. |
| 6,088,692 A | 7/2000 | Driscoll |
| 6,125,347 A | 9/2000 | Cote et al. |
| 6,192,339 B1 | 2/2001 | Cox |
| 6,192,343 B1 | 2/2001 | Morgan et al. |
| 6,199,061 B1 | 3/2001 | Blewett et al. |
| 6,262,730 B1 | 7/2001 | Horvitz et al. |
| 6,289,312 B1 | 9/2001 | Raman |
| 6,330,577 B1 | 12/2001 | Kim |
| 6,374,226 B1 | 4/2002 | Hunt et al. |
| 6,442,522 B1 | 8/2002 | Carberry et al. |
| 6,446,135 B1 | 9/2002 | Koppolu et al. |
| 6,493,702 B1 | 12/2002 | Adar et al. |
| 6,535,854 B2 | 3/2003 | Buchner et al. |
| 6,539,078 B1 | 3/2003 | Hunt et al. |
| 6,542,163 B2 | 4/2003 | Gorbet et al. |
| 6,604,075 B1 | 8/2003 | Brown et al. |
| 6,615,177 B1 | 9/2003 | Rapp et al. |
| 6,618,726 B1 | 9/2003 | Colbath et al. |
| 6,693,651 B2 | 2/2004 | Biebesheimer et al. |
| 6,728,700 B2 | 4/2004 | Richards et al. |
| 6,744,451 B1 | 6/2004 | Anderson et al. |
| 6,778,193 B2 | 8/2004 | Biebesheimer et al. |
| 6,839,896 B2 | 1/2005 | Coffman et al. |
| 6,847,959 B1 | 1/2005 | Arrouye et al. |
| 6,948,133 B2 | 9/2005 | Haley |
| 6,948,135 B1 | 9/2005 | Ruthfield et al. |
| 7,043,700 B1 | 5/2006 | Bertram et al. |
| 7,062,711 B2 | 6/2006 | Kethireddy |
| 7,069,220 B2 | 6/2006 | Coffman et al. |
| 7,073,126 B1 | 7/2006 | Khandekar |
| 7,113,950 B2 | 9/2006 | Brill et al. |
| 7,124,129 B2 | 10/2006 | Bowman et al. |
| 7,130,790 B1 | 10/2006 | Flanagan et al. |
| 7,133,950 B2 | 11/2006 | Olukotun |
| 7,137,071 B2 | 11/2006 | Fuller et al. |
| 7,149,550 B2 | 12/2006 | Kraft et al. |
| 7,185,001 B1 | 2/2007 | Burdick et al. |
| 7,206,747 B1 | 4/2007 | Morgan et al. |
| 7,231,642 B2 | 6/2007 | Araki et al. |
| 7,254,539 B2 | 8/2007 | Carberry et al. |
| 7,254,784 B2 | 8/2007 | Chang |
| 7,440,941 B1 | 10/2008 | Borkovsky et al. |
| 7,505,910 B2 | 3/2009 | Kujirai |
| 7,539,939 B1 | 5/2009 | Schomer |
| 7,596,754 B2 * | 9/2009 | Wessling ............... G06Q 10/10 715/705 |
| 7,684,985 B2 | 3/2010 | Dominach et al. |
| 7,703,037 B2 | 4/2010 | McGlinchey et al. |
| 7,925,975 B2 | 4/2011 | Bala et al. |
| 8,185,427 B2 * | 5/2012 | Messer .................. G06F 8/38 705/7.21 |
| 8,370,743 B2 | 2/2013 | Bala |
| 8,942,985 B2 | 1/2015 | Mowatt et al. |
| 2001/0044726 A1 | 11/2001 | Li et al. |
| 2002/0048350 A1 | 4/2002 | Phillips et al. |
| 2002/0052870 A1 | 5/2002 | Charlesworth et al. |
| 2002/0080157 A1 | 6/2002 | Chickles et al. |
| 2002/0103789 A1 | 8/2002 | Turnbull et al. |
| 2002/0105550 A1 | 8/2002 | Biebesheimer et al. |
| 2002/0118220 A1 | 8/2002 | Lui et al. |
| 2002/0133354 A1 | 9/2002 | Ross et al. |
| 2002/0152255 A1 | 10/2002 | Smith et al. |
| 2002/0156629 A1 | 10/2002 | Carberry et al. |
| 2002/0161584 A1 | 10/2002 | Lewis et al. |
| 2002/0188612 A1 | 12/2002 | Yu et al. |
| 2002/0194164 A1 * | 12/2002 | Morrow ............... G06F 9/4446 |
| 2002/0198714 A1 | 12/2002 | Zhou |
| 2003/0004941 A1 | 1/2003 | Yamada et al. |
| 2003/0014260 A1 | 1/2003 | Coffman et al. |
| 2003/0016238 A1 | 1/2003 | Sullivan et al. |
| 2003/0046088 A1 | 3/2003 | Yuschik |
| 2003/0171928 A1 | 9/2003 | Falcon et al. |
| 2003/0171929 A1 | 9/2003 | Falcon et al. |
| 2003/0177013 A1 | 9/2003 | Falcon et al. |
| 2003/0200254 A1 | 10/2003 | Wei |
| 2003/0234818 A1 | 12/2003 | Schmid et al. |
| 2004/0046789 A1 | 3/2004 | Inanoria |
| 2004/0073540 A1 | 4/2004 | Wang et al. |
| 2004/0243415 A1 | 12/2004 | Commarford et al. |
| 2004/0260562 A1 | 12/2004 | Kujirai |
| 2005/0027539 A1 | 2/2005 | Weber et al. |
| 2005/0060138 A1 | 3/2005 | Wang et al. |
| 2005/0066270 A1 | 3/2005 | Ali et al. |
| 2005/0071777 A1 | 3/2005 | Roessler et al. |
| 2005/0075857 A1 | 4/2005 | Elcock et al. |
| 2005/0076023 A1 | 4/2005 | Wu et al. |
| 2005/0081152 A1 | 4/2005 | Commarford et al. |
| 2005/0108026 A1 | 5/2005 | Brierre et al. |
| 2005/0114319 A1 | 5/2005 | Brent et al. |
| 2005/0131691 A1 | 6/2005 | Fischer et al. |
| 2005/0131701 A1 | 6/2005 | Cross et al. |
| 2005/0138559 A1 | 6/2005 | Santos-Gomez et al. |
| 2005/0166148 A1 | 7/2005 | Garding |
| 2005/0185773 A1 | 8/2005 | Burger et al. |
| 2005/0240558 A1 | 10/2005 | Gil et al. |
| 2005/0278728 A1 | 12/2005 | Klementiev |
| 2005/0283473 A1 | 12/2005 | Rousso et al. |
| 2006/0048060 A1 | 3/2006 | Mohr et al. |
| 2006/0053384 A1 | 3/2006 | La Fetra et al. |
| 2006/0101347 A1 | 5/2006 | Runov et al. |
| 2006/0106614 A1 | 5/2006 | Mowatt et al. |
| 2006/0136195 A1 | 6/2006 | Agapi et al. |
| 2006/0143575 A1 | 6/2006 | Sauermann |
| 2006/0150112 A1 | 7/2006 | Marchev |
| 2006/0155687 A1 | 7/2006 | Chou |
| 2006/0167851 A1 | 7/2006 | Ivanov |
| 2006/0168522 A1 | 7/2006 | Bala |
| 2006/0184899 A1 | 8/2006 | Klassen et al. |
| 2006/0190256 A1 | 8/2006 | Stephanick et al. |
| 2006/0190429 A1 | 8/2006 | Sidlosky et al. |
| 2006/0200827 A1 | 9/2006 | Sidlosky et al. |
| 2006/0241995 A1 * | 10/2006 | McGlinchey ....... G06F 9/44505 715/853 |
| 2006/0259479 A1 | 11/2006 | Dai |
| 2007/0033172 A1 * | 2/2007 | Williams et al. ................. 707/3 |
| 2007/0038601 A1 * | 2/2007 | Guha ................ G06F 17/30867 |
| 2007/0143704 A1 | 6/2007 | Laird-McConnell |
| 2007/0189724 A1 | 8/2007 | Wan et al. |
| 2008/0065617 A1 | 3/2008 | Burke et al. |
| 2015/0095030 A1 | 4/2015 | Mowatt et al. |

FOREIGN PATENT DOCUMENTS

| | | |
|---|---|---|
| EP | 911808 | 4/1999 |
| EP | 1045374 | 10/2000 |
| EP | 1215657 A2 | 6/2002 |
| EP | 1246430 A2 | 10/2002 |
| EP | 1603031 A2 | 12/2005 |
| JP | 2001-034289 | 9/2001 |
| JP | 2002-182688 | 6/2002 |
| JP | 2003-084794 | 3/2003 |
| JP | 2004-110613 | 4/2004 |
| JP | 2004-234273 | 8/2004 |
| WO | 9525325 | 9/1995 |
| WO | WO 9735253 A1 | 9/1997 |
| WO | WO 0144932 A1 | 6/2001 |
| WO | WO 0175579 A2 | 10/2001 |
| WO | WO 0212982 A2 | 2/2002 |
| WO | 2002075538 | 9/2002 |

OTHER PUBLICATIONS

Extended European Search Report for Application No. 07751459.4-2211, mailed Apr. 26, 2010, 8 pages.

XAML—A Business Perspective, <<http://www.xaml.net>>, January 4, 2006, 2 pgs.

Create Rich Client Apps with the Dom. Padilla, pp. 1-7. (Feb. 14, 2004).

(56) References Cited

OTHER PUBLICATIONS

PCT Search Report, PCT/US2007/004699, Filed Feb. 23, 2007, 3 pages.
European Search Report for Application No. 05107831.9, dated Mar. 15, 2006, 3 pages.
Mahesh, K. "Advanced Search Capabilities in Oracle8i intermedia text," Oracle Corporation, Online! 1999-11, pp. 1-6.
Davidson, J. Running Mac OS X Panther, Dec. 2003, 1st Edition, Ch. 2.
Chinese First Official Action for Application No. 2005101036571, dated Apr. 10, 2009, 13 pages.
Bass & Bunker, L. & R.; "A Generalized User Interface for Applications Programs," Communications of the ACM, V. 24, No. 12, Dec. 1981, pp. 796-800.
Shneiderman, B.; "Clarifying Search: A User-Interface Framework for Text Searches," D-Lib Magazine, Jan. 1997, pp. 1-18.
Prosecution History for U.S. Appl. No. 11/701,125 including: Issue Notification dated Jan. 16, 2013, Notice of Allowance dated Oct. 2, 2012, Amendment dated Sep. 19, 2012, Final Office Action dated Aug. 29, 2012, Amendment dated May 21, 2012, Non-Final Office Action dated Mar. 13, 2012, Amendment with RCE dated Mar. 23, 2011, Final Office Action dated Nov. 15, 2010, Amendment dated Sep. 17, 2010, Non-Final Office Action dated Jun. 10, 2010, Part 1 of 2.
Prosecution History for U.S. Appl. No. 11/701,125 including: Amendment with RCE dated Apr. 21, 2010, Final Office Action dated Feb. 16, 2010, Amendment dated Nov. 20, 2009, Non-Final Office Action dated Sep. 11, 2009 and Application and Drawings filed Feb. 1, 2007, Part 2 of 2, 256 pages.
Prosecution History for U.S. Appl. No. 11/372,545 including: Issue Notification dated Mar. 23, 2011, Notice of Allowance dated Dec. 17, 2010, Amendment dated Sep. 21, 2010, Non-Final Office Action dated Jul. 8, 2010, Amendment with RCE dated May 14, 2010, Final Office Action dated Feb. 2, 2010, Amendment dated Nov. 17, 2009, Non-Final Office Action dated Aug. 3, 2009, Advisory Action dated Feb. 27, 2009, Amendment with RCE dated Feb. 17, 2009, Part 1 of 2.
Prosecution History for U.S. Appl. No. 11/372,545 including: Final Office Action dated Nov. 28, 2008, Amendment dated Sep. 15, 2008, Non-Final Office Action dated Apr. 17, 2008 and Application and Drawings filed Mar. 10, 2006, Part 2 of 2, 178 pages.
Prosecution History for U.S. Appl. No. 11/109,997 including: Issue Notification dated Mar. 31, 2010, Notice of Allowance dated Feb. 22, 2010, Amendment dated Dec. 14, 2009, Non-Final Office Action dated Sep. 24, 2009, Amendment with RCE dated Jun. 30, 2009, Final Office Action dated Mar. 20, 2009, Interview Summary dated Jan. 23, 2009, Amendment dated Jan. 15, 2009, Non-Final Office Action dated Oct. 15, 2008, Amendment with RCE dated Jul. 29, 2008, Part 1 of 2.
Prosecution History for U.S. Appl. No. 11/109,997 including: Advisory Action dated May 30, 2008, Amendment dated May 21, 2008, Interview Summary dated Apr. 17, 2008, Final Office Action dated Feb. 21, 2008, Amendment dated Nov. 21, 2007, Non-Final Office Action dated Sep. 7, 2007 and Application and Drawings filed Apr. 20, 2005, Part 2 of 2, 206 pages.
Raman, T.V.:, "Speech-Enablement of Eclipse IDE and Eclipse Rich Client Applications Using AspectJ", IBM Search, Accessed Feb. 10, 2011, 13 pages.
Little & Miller, G&R.:, "Translating Keyword Commands into Executable Code", UIST'06, Switzerland, 10 pages.
Third Chinese Office Action for Chinese Application No. 200510116339.9 mailed May 3, 2012, 6 pages.
Second Chinese Office Action for Chinese Application No. 200510116339.9 dispatch date Feb. 3 2012, 6 pages.
Notice of Rejection for Japanese Patent Application No. 2005-299982 mailed May 24, 2011 with English Translation, 6 pages.
Reithinger, Norbert. et al. "SmartKom: adaptive and flexible multimodal access to multiple applications." Proceedings of the 5th international conference on Multimodal interfaces. ACM, 2003. 8 pages.

European Search Report dated Nov. 8, 2005 for Application No. 05106352.7, 5 pages.
Potamitis, Ilyas, et al. "An integrated system for smart-home control of appliances based on remote speech interaction." INTERSPEECH, 2003. 5 pages.
European Search Report dated Mar. 21, 2006 for Application No. 05109794.7, 7 pages.
Chang, Eric. "Efficient multimodal method to provide input to a computing device." U.S. Appl. No. 10/889,822, 34 pages.
Chang, Eric, et al. "A system for spoken query information retrieval on mobile devices." Speech and Audio Processing, IEEE Transactions on 10.8 (2002): 531-541.
Bostwick et al., "Flexi-modal and multi-machine user interfaces." Proceedings of he 4th IEEE International Conference on Multimodal Interfaces. IEEE Computer Society, 2002. 6 pages.
Kvale, Knut, N. Warakagoda, and Jan Eikeset Knudsen. "Speech centric multimodal interfaces for mobile communication systems." Telektronikk 99.2 (2003): 104-117.
Seide, Frank, et al. "Vocabulary-independent search in spontaneous speech," Acoustics, Speech, and Signal Processing, 2004. Proceedings.(ICASSP'04). IEEE International Conference on. vol. 1. IEEE, 2004. 4 pages.
Manaris, Bill Z., Valanne MacGyvers, and Michail G. Lagoudaki. "Universal Access to Mobile Computing Devices through Speech Input." FLAIRS Conference. 1999. 7 pages.
Chang, Eric, et al. "Efficient web search on mobile devices with multi-modal input and intelligent text summarization." The 11th Int. WWW Conference. 2002. 4 pages.
Gu, Huixiang, et al. "Spoken Query for Web Search and Navigation." WWW Posters, 2001. 2 pages.
Wasinger, Rainer, Christoph Stahl, and Antonio Krueger. "Robust speech interaction in a mobile environment through the use of multiple and different media input types." The 8th European Conference on Speech Communication and Technology (Eurospeech). 2003. 4 pages.
Iftikhar, Ahmad, et al. "Query by Image Content using Nokia 9210 Communicator." Proc. of the Workshop on Image Analysis for Multimedia Interactive Services, WIAMIS. vol. 1. 2001, 5 pages.
Prosecution History for U.S. Appl. No. 10/990,345 including: Notice of Allowance dated Sep. 10, 2014, Decision on Appeal dated Jun. 11, 2014, Appeal Docketing Notice dated Nov. 10, 2011, Interview Summary dated Sep. 29, 2011, Reply Brief dated Jul. 15, 2011, Examiner's Answer to Appeal Brief dated May 16, 2011, Appeal Brief dated Feb. 14, 2011, Notice of Appeal dated Dec. 6, 2010, Final Office Action dated Aug. 5, 2010, Amendment dated Apr. 29, 2010, Non-Final Office Action dated Feb. 4, 2010. Part 1 of 3.
Prosecution History for U.S. Appl. No. 10/990,345 including: Amendment dated Oct. 21, 2009, Non-Final Office Action dated Jul. 31, 2009, Appeal Brief dated Apr. 16, 2009, Notice of Appeal dated Mar. 2, 2009, Advisory Action dated Jan. 13, 2009, Response After Final dated Dec. 29, 2008, Interview Summary dated Dec. 19, 2008, Final Office Action dated Oct. 28, 2008, Interview Summary dated Jun. 19, 2008, Amendment dated Jun. 17, 2008, Part 2 of 3.
Prosecution History for U.S. Appl. No. 10/990,345 including: Non-Final Office Action dated Mar. 17, 2008, Preliminary Amendment dated Jan. 24, 2008, and Application and Drawings filed Nov. 16, 2004, Part 3 of 3, 401 pages.
Office Action from India Patent Application No. 2345/DEL/2005 dated Nov. 25, 2014. 2 pages.
Issue Notification for U.S. Appl. No. 10/990,345 dated Jan. 7, 2015, 1 page.
McGee, et al., "Confirmation in Multimodal Systems", In Proceedings of the 36th Annual Meeting of the Association for Computational Linguistics and 17th International Conference on Computational Linguistics, vol. 2, Aug. 10, 1998, 7 Pages.
Mankoff, Jennifer, "Proposal of a Model Architecture Handling Ambiguity in Recognition-Based Input", Dissertation Submitted in Partial Fulfillment of the Requirement for the Degree of Doctor of Philosophy in College Computing, 1999, 55 Pages.

(56) References Cited

OTHER PUBLICATIONS

Mankoff, et al., "Interaction Techniques for Ambiguity Resolution in Recognition-Based Interfaces", In Proceedings of the 13th Annual ACM Symposium on User Interface Software and Technology, 2000, 10 Pages.
Libuda, Lars: "Improving clarification dialogs in speech command systems with the help of user modeling: A conceptualization for an in-car user interface", Proceedings of the GI-Workshop, 2001, 5 pages.
Prosecution History for U.S. Appl. No. 14/563,255 including: Non-Final Office Action dated Jul. 29, 2016, Preliminary Amendment dated May 31, 2016, and Preliminary Amendment dated May 11, 2016, 35 pages.
First Chinese Office Action for Patent No. 200510116339.9, date of mailing: Jul. 25, 2008, 5 pages.
Application and Drawings for U.S. Appl. No. 15/292,871, filed Oct. 13,2016, 41 pages.
Amendment for U.S. Appl. No. 14/563,255 dated Nov. 23, 2016, 12 pages.
Final Office Action for U.S. Appl. No. 14/563,255 dated Mar. 6, 2017, 23 pages.

* cited by examiner

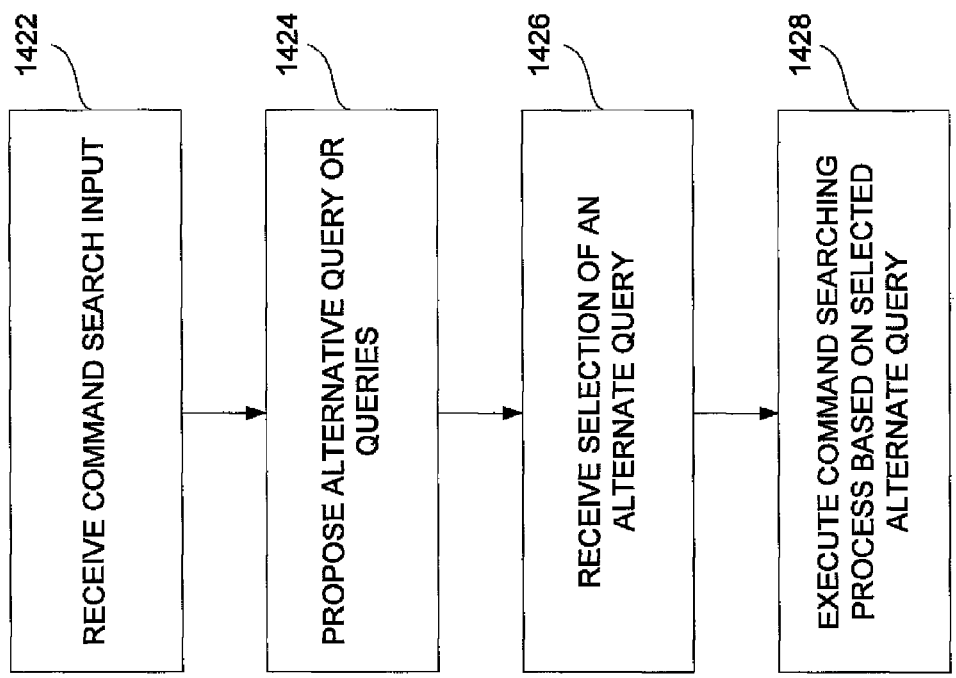

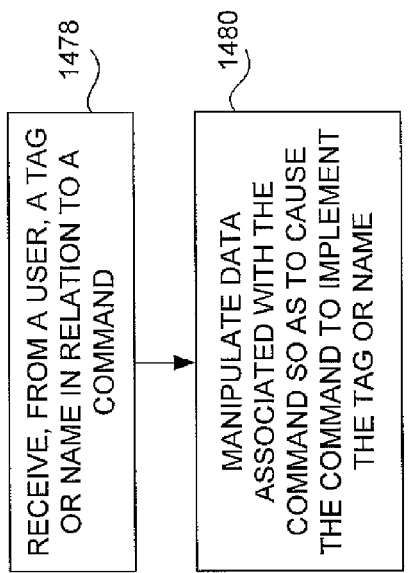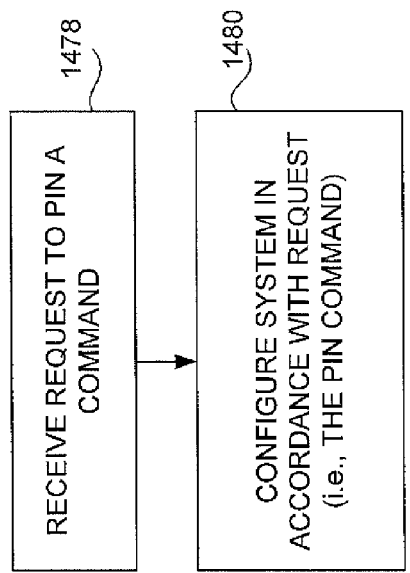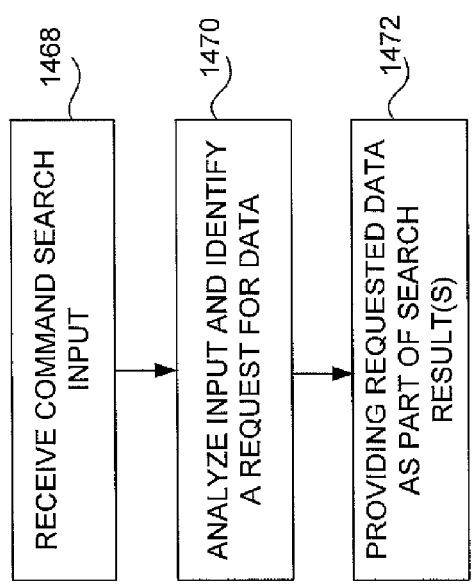

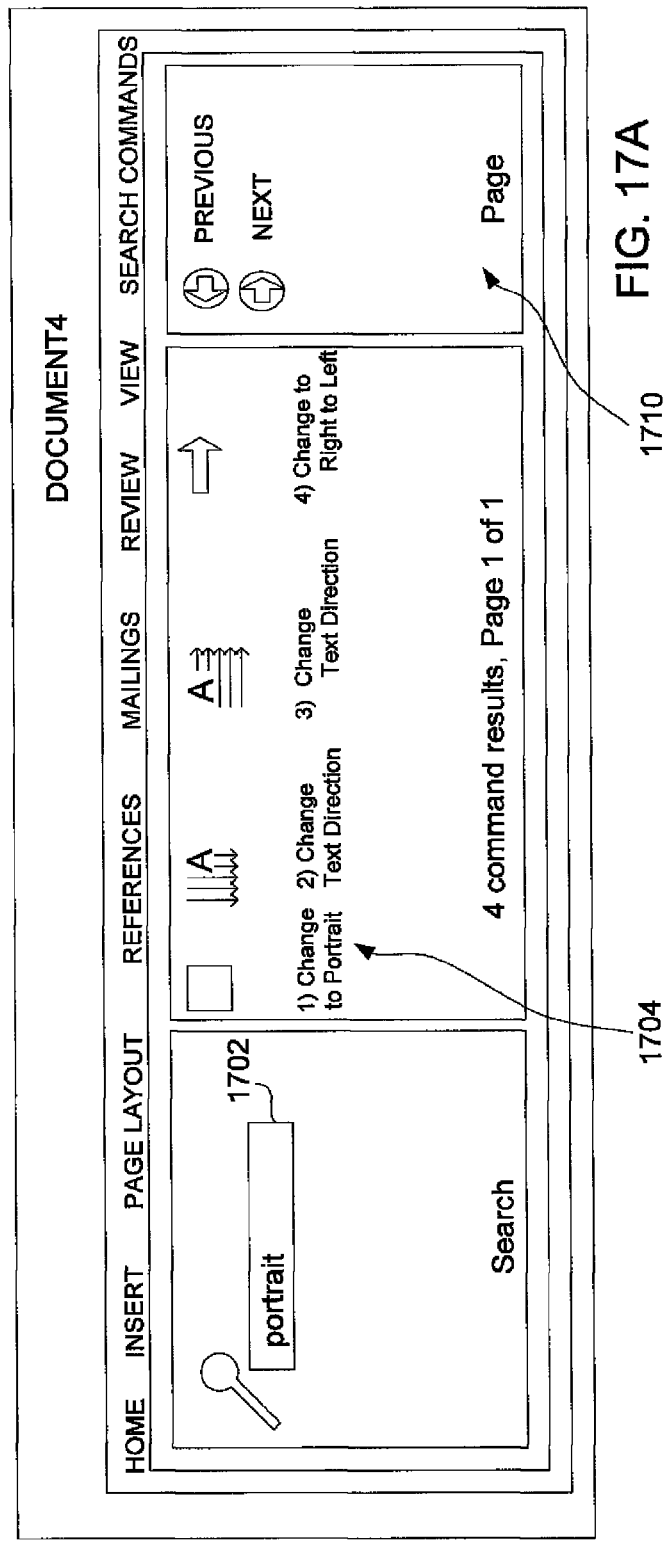

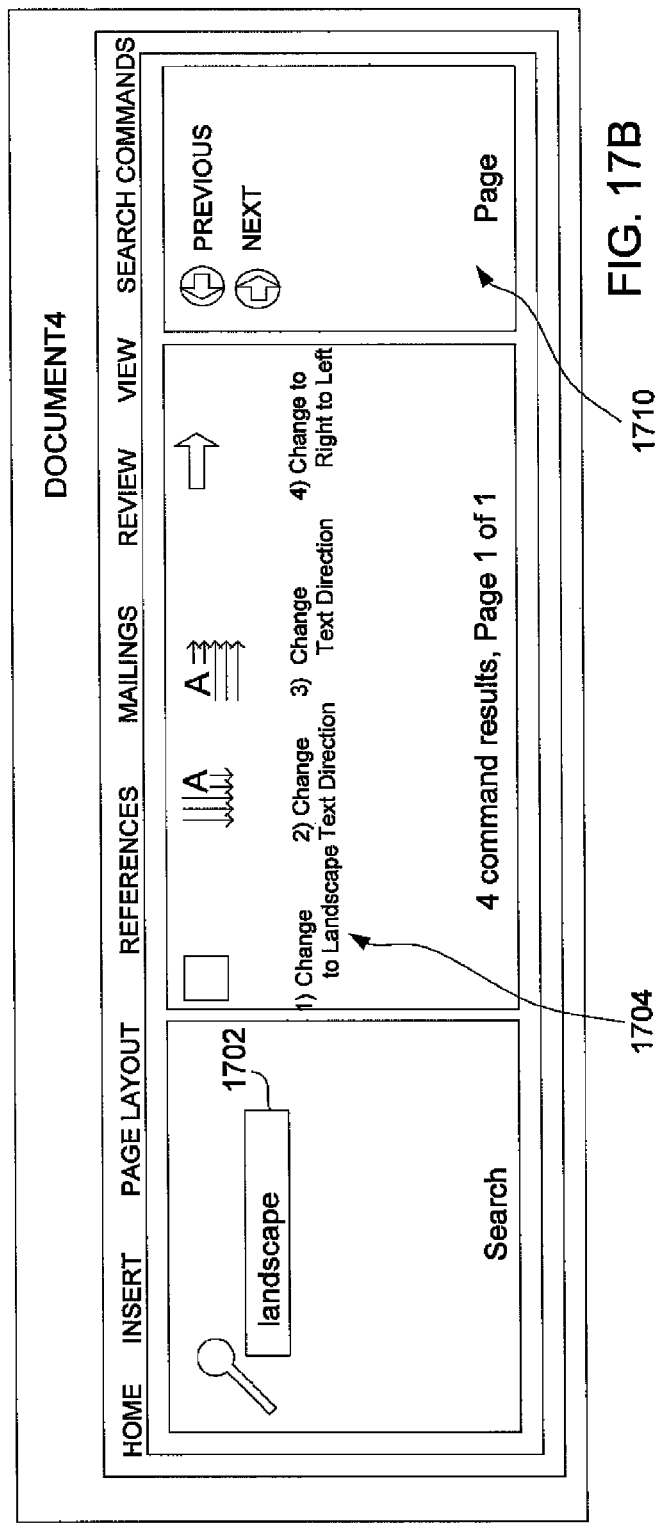

COMMAND SEARCHING ENHANCEMENTS

CROSS-REFERENCE TO RELATED APPLICATION

The present application is a continuation of and claims priority of U.S. patent application Ser. No. 11/701,125, filed Feb. 1, 2007, which is a continuation-in-part application of and claims priority to U.S. patent application Ser. No. 11/372,545, filed Mar. 10, 2006, now U.S. Pat. No. 7,925,975, issued Apr. 12, 2011, the content of which is hereby incorporated by reference in its entirety.

BACKGROUND

A wide variety of different types of computer applications are currently in use. Such computer applications often fall into three or more different categories. For instance, rich client applications are typically applications that run on a client device, such as a desktop computer or laptop computer. Other software applications include web-based applications in which a client interacts with a web-based device, such as a server using a web browser, in order to run the application. Still other software applications include mobile device applications. Mobile device applications might run on mobile devices, such as personal digital assistants (PDAs), telephones, handheld computers, etc.

In running a software application, a user typically wishes to perform one or more different tasks. As used herein, the term task means anything that a user wishes to do in the context of a given software application.

In order to allow users to accomplish the desired tasks, many current software applications provide a graphical user interface. The user executes one or more commands on the graphical user interface to accomplish a desired task. There are substantially three main ways by which people accomplish tasks using a graphical user interface, and they depend on how frequently the user performs a given task. For tasks that are performed frequently by the user, the user might learn or memorize the sequence of steps (or commands) required to perform the task with the graphical user interface. Also with frequently performed tasks, applications might expose the user interface elements for performing the most popular tasks prominently in the user interface.

A second group of tasks are those that are performed infrequently by the user. The user may typically browse the menus or tool bars displayed by the graphical user interface, in order to attempt to locate the user interface element that can be used to perform the desired task. Another way in which users perform infrequent tasks is to seek the help of other people to find out how to perform the task. In doing this, the user might go to a news group or simply ask another individual how to perform the task.

Finally, when the user does not remember how to perform the task, and cannot find out how to perform the task by asking others, users might typically invoke a help mechanism associated with the application. For instance, some applications are associated with help documentation stored on a client, or on a web site. The help documentation allows a user to search for a help topic that often explains what to do in order to accomplish a task that a user wishes to perform.

Of course, there are a number of problems associated with these types of current systems. Unless the user has the steps for performing a task memorized, it can be fairly cumbersome for the user to find out how to perform the task. Asking news groups or physically asking other persons how to perform a task takes a relatively large amount of time and thus reduces efficiency.

In addition, even where the user attempts to hunt through the user interface to find the user interface element necessary to accomplish the desired task, the user may encounter problems. For instance, in most graphical user interfaces, the features or elements associated with the graphical user interface are categorized under other elements. In other words, the user may go to the "File" drop down menu to look for a particular feature or element of the graphical user interface. The user may also go to the "Edit" drop down menu to look for another feature. Of course, if the sought after feature is under an unexpected drop down menu, this can result in frustration and extra time required for the user to find that feature.

Similarly, attempting to determine how to perform a task using help documentation often requires a fairly high level of knowledge about the task. For instance, some help documentation is simply an alphabetical listing of different tasks. This may be extremely unhelpful to a user who does not know the technical term for the task to be performed. By way of example, in one spreadsheet software application, adding rows and columns to a spreadsheet is performed using an "insert" command. Of course, it would take a user a fairly long time to track this command down, if the user was simply looking under the "add" commands in the help documentation.

Similarly, many help mechanisms provide information that is not useful in a given context. For instance, assume the user is in a word processing application which has no tables in it, but the user wishes to add a table. The help mechanism might typically be arranged with all information related to tables found in a plurality of different spots within the help documentation. Thus, the help documentation might include modifying existing tables, adding or deleting rows or columns from tables, and a wide variety of other information dealing with already-existing tables. Of course, since the user's document has no already-existing tables, this information is completely useless to the user. Yet, the user must sift through this information in order to identify the steps necessary to add a table.

The discussion above is merely provided for general background information and is not intended to be used as an aid in determining the scope of the claimed subject matter.

The discussion above is merely provided for general background information and is not intended to be used as an aid in determining the scope of the claimed subject matter.

SUMMARY

A user can access a searching component that allows the user to enter search terms to search for commands associated with a computer program. Some specific embodiments pertain to methods for supporting user access to the searching component, to methods for processing search terms submitted by the user, and to methods for guiding the user in terms of their formulation and selection queries. Methods for generating, organizing and manipulating the search results are also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 14E is a flowchart demonstrating one implementation of a query feedback component.

FIG. 14K is a flowchart demonstrating one implementation of a gallery display component.

FIG. 14L is a flowchart demonstrating one implementation of a data provider component.

FIG. 14M is a flowchart demonstrating one implementation of a tagging/renaming component.

FIG. 14N is a flowchart demonstrating one implementation of a command pinning component.

FIGS. 15A, 15B, 16, 17A 17B, 18, and 19 are example screenshots demonstrating graphical user interfaces.

DETAILED DESCRIPTION

The present subject matter deals with searching for commands associated with software applications, and executing those commands. However, before that subject matter is discussed in more detail, two illustrative computing devices will be described.

Figure 1:
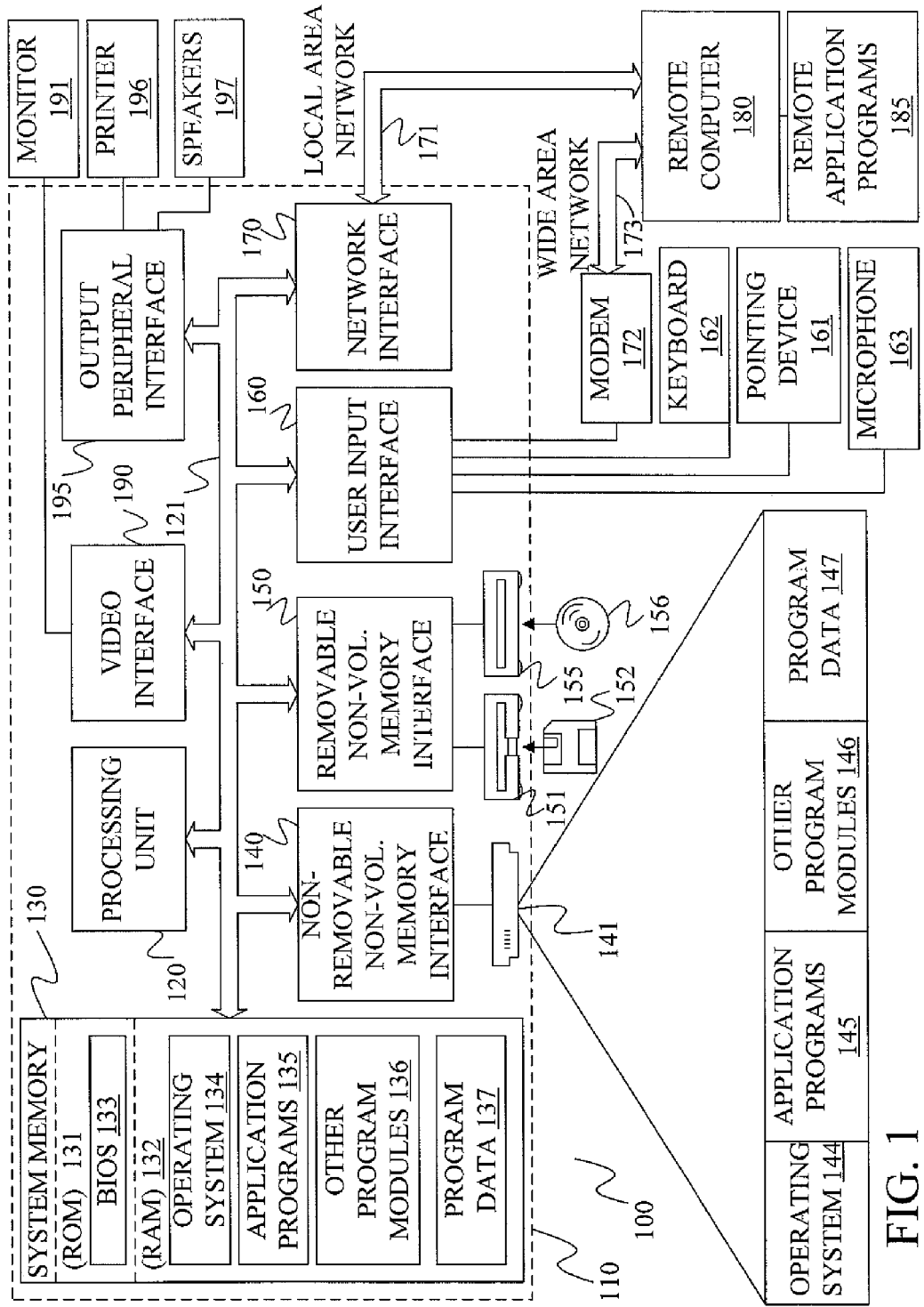
FIG. 1 is a block diagram of a computing environment.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
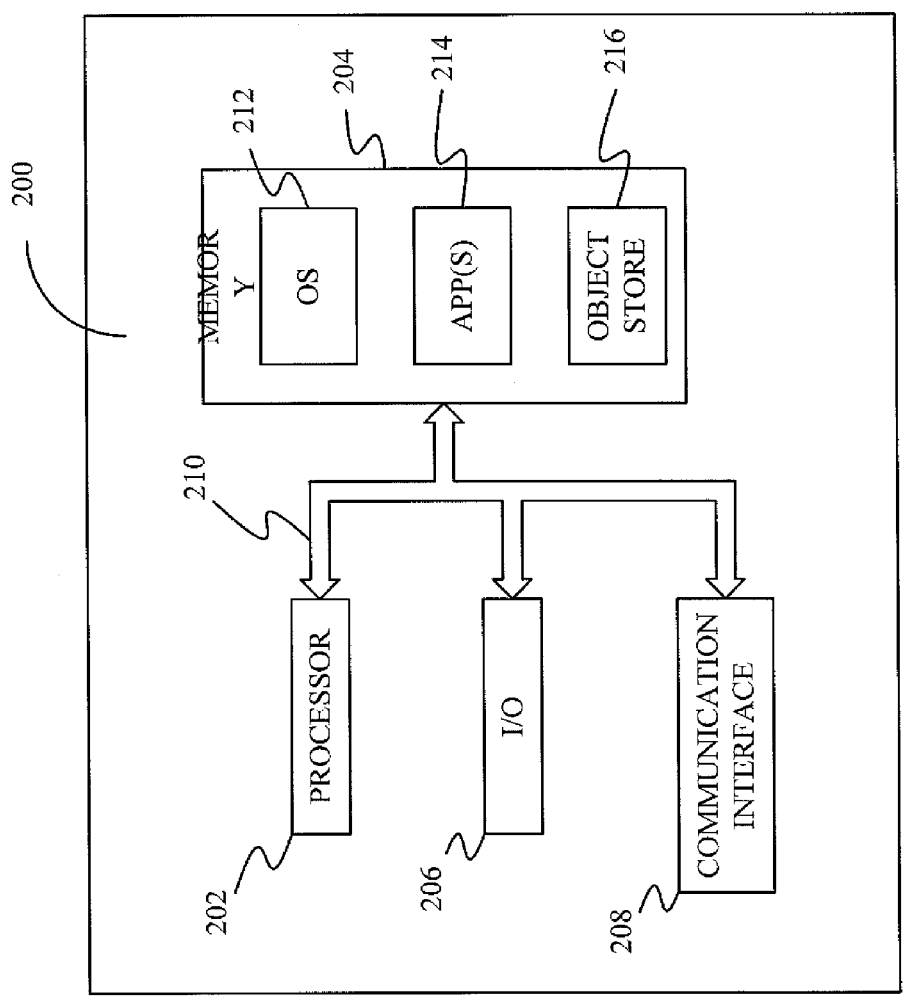
FIG. 2 is a block diagram of a mobile device.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
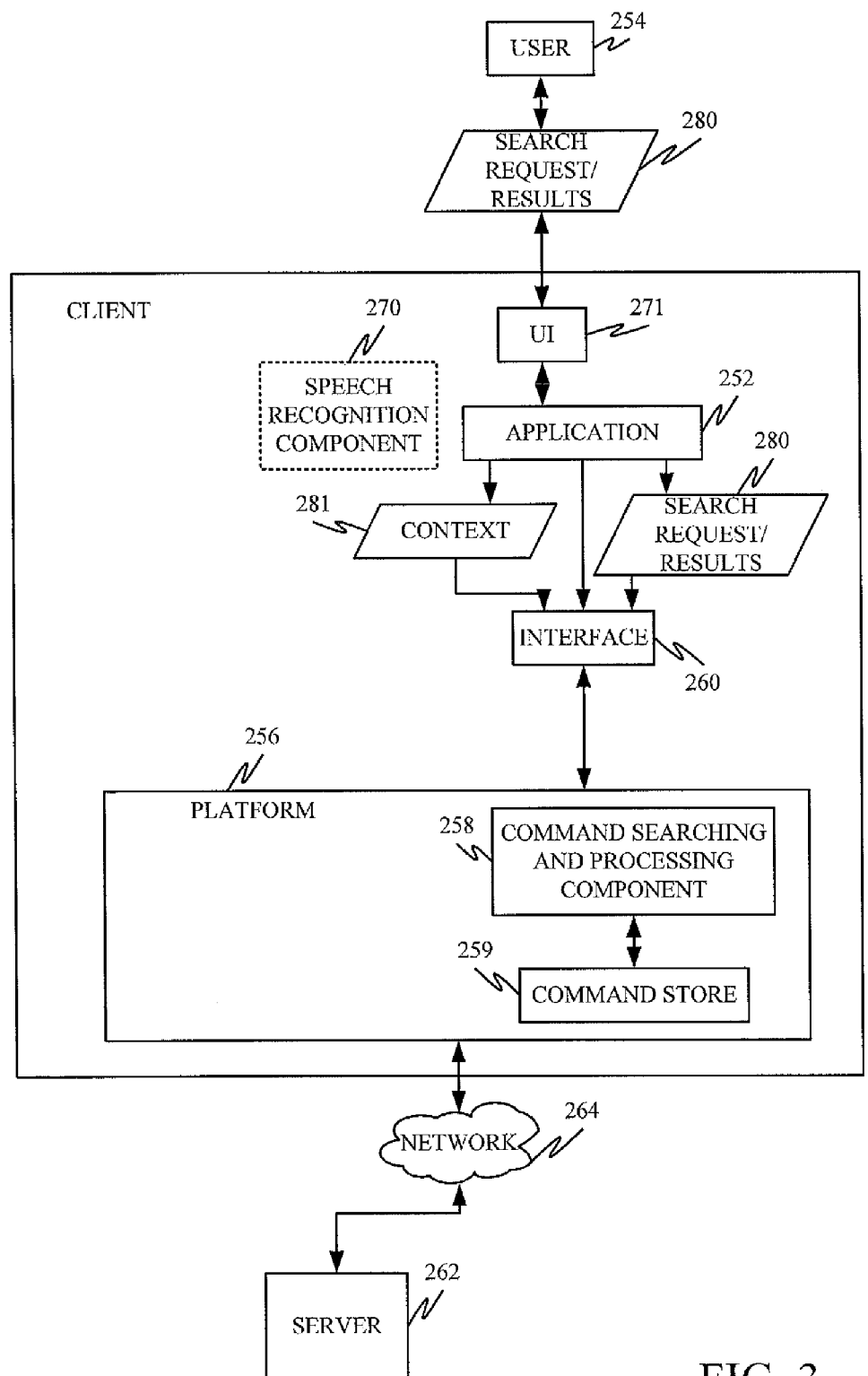
FIG. 3 is a diagrammatic representation of a system within which command searching and processing are performed on a client.

FIG. 3 is a block diagram of a computing environment in accordance with an embodiment in which command searching and processing is performed on a client 250. Client 250 is illustratively a desktop computer, a laptop computer, or a mobile device, such as a personal digital assistant, a telephone, a handheld computer, etc. In the embodiment shown in FIG. 3, client 250 has a software application 252 thereon which is accessed by user 254 such that the user can execute one or more commands to perform a variety of different tasks. For example, application 252 may be a word processing program, a spreadsheet program, a presentation program, or any other software application that can be accessed by a user 254, though a user interface 271, to perform tasks.

Client 250 is shown with a platform 256. In one embodiment, platform 256 is, for example, an operating system that supports a plurality of different applications 252. In the embodiment shown in FIG. 3, platform 256 includes command searching and processing component 258 and command store 259. As is described in greater detail below, component 258 is exposed to user 254 through application 252 (or independent of application 252) such that the user can search for commands associated with application 252, and optionally execute the desired commands. In one embodiment, platform 256 exposes an interface 260, such as an application programming interface, which can be invoked by application 252.

Client 250 is also shown with an optional speech recognition component 270. This can be used as described below.

In the embodiment shown in FIG. 3, client 250 is also connected to a server 262 though a network 264. Network 264 can be any desired network, such as a wide area network, a local area network, etc.

Figures 4, 4A:
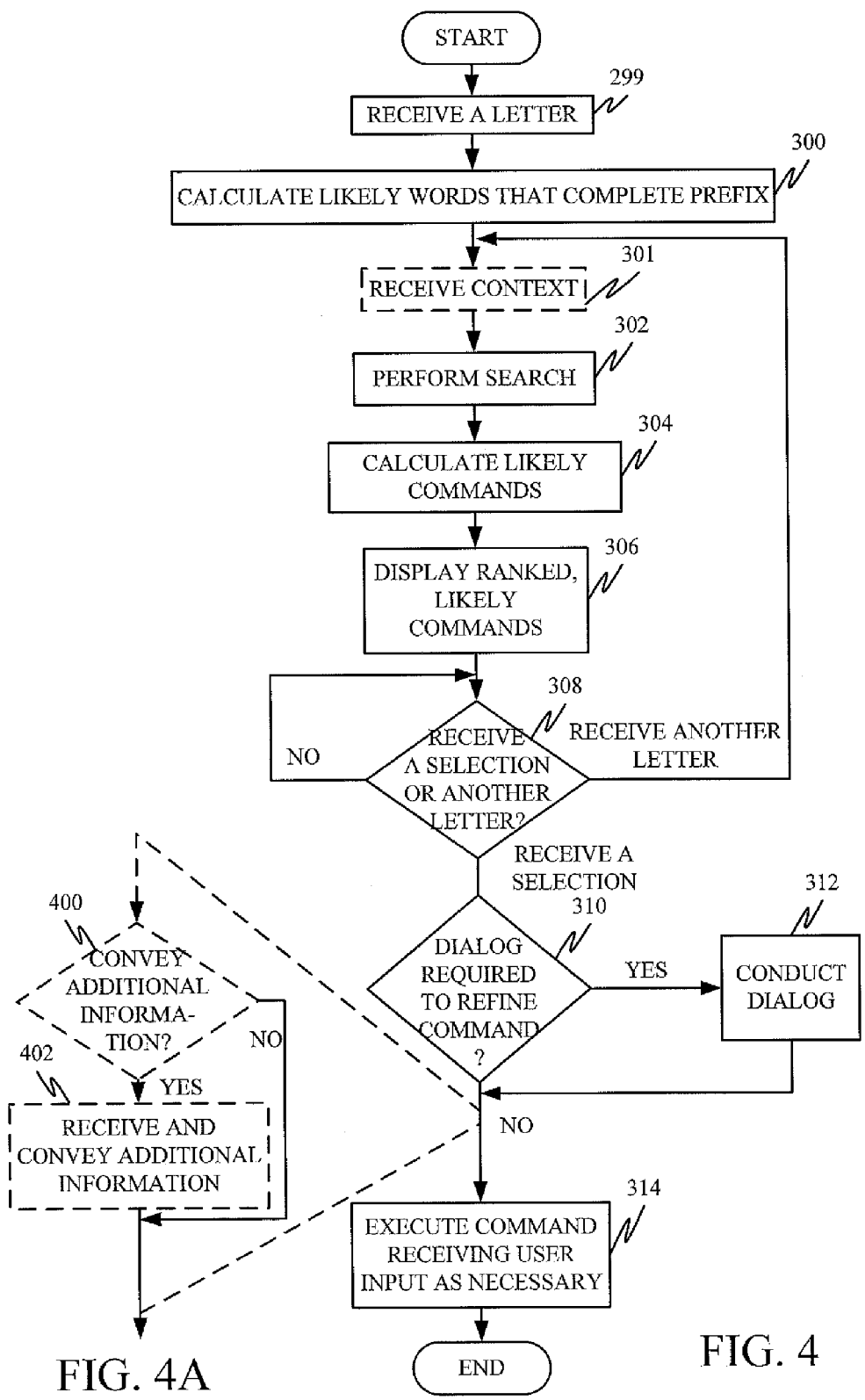
FIG. 4 is a flow diagram demonstrating steps associated with operation of the system shown in FIG. 2.
FIG. 4A is a flow diagram illustrating a number of optional steps.

FIG. 4 is a flow diagram illustrating one embodiment of the operation of the system shown in FIG. 3. FIGS. 3 and 4 will now be described in conjunction with one another. For the purposes of this discussion, it is assumed that user 254 launches application 252 and desires to perform a task using application 252. The user illustratively does not know the command or commands required to perform the task. In other words, the user has not memorized the steps necessary (or the location of the user interface elements required) to perform the desired task. Therefore, user 254 must locate the command required to perform the desired task.

In accordance with one embodiment, user 254 begins to enter a search request. In one embodiment, user 254 can enter the search request through speech recognition component 270, by simply speaking the desired search request. For purposes of the present discussion, however, it will be assumed that the user types in the search request one letter at a time, but the invention is not to be so limited.

Figure 5:
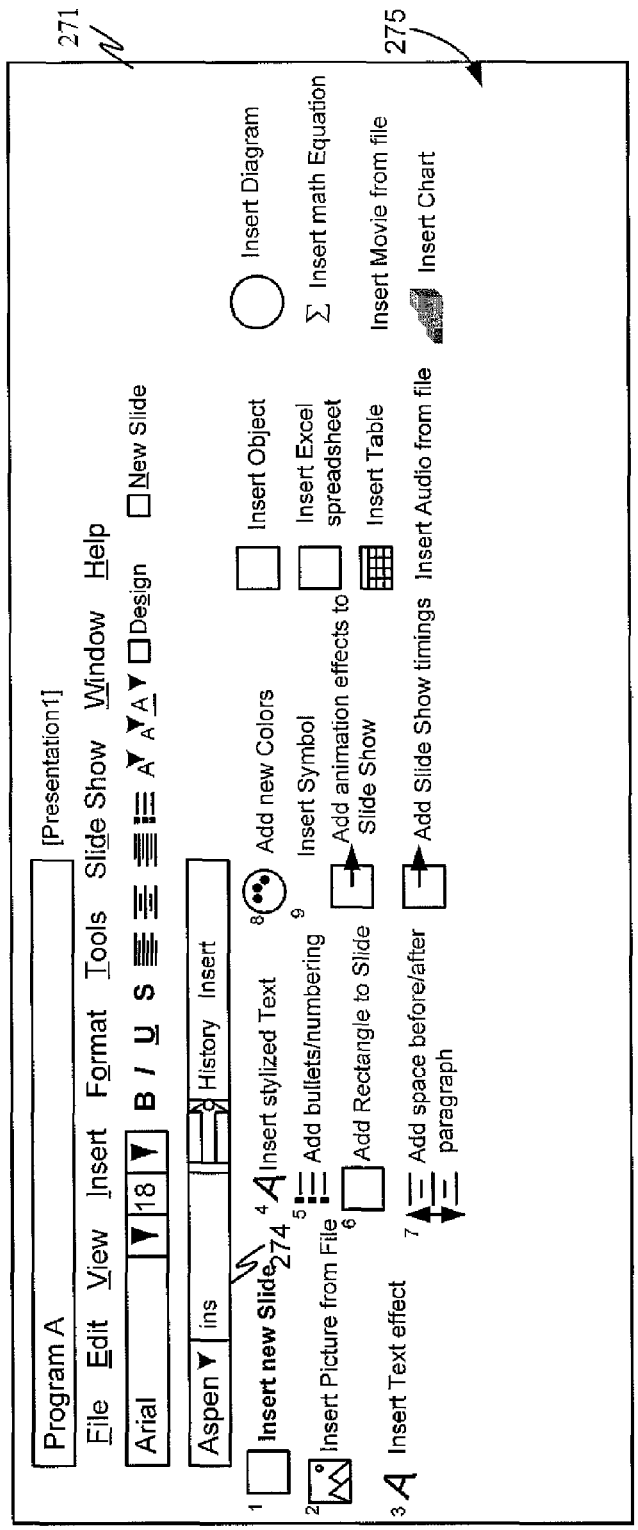
FIGS. 5-9, 10A and 10B are example screenshots demonstrating graphical user interfaces.

In any case, FIG. 5 shows one graphical user interface 271 which can be used to receive entry of the search request. User interface 271 in FIG. 4 illustrates that application 252 is a presentation program referred to as "Program A". Command searching and processing component 258 exposes text box 274 through user interface 271 of application 252, to the user. The user can enter a search request, letter by letter, into text box 274.

Therefore, after the user 254 types in a first letter in text box 274 on user interface 271, the letter is transmitted, as a search request 280, to command searching and processing component 258 in platform 256. In order to do this, in one embodiment, application 250 provides the search request 280 through the interface 260 exposed by component 258. Receiving the first letter at command searching and processing component 258 is indicated by block 299 in FIG. 4.

Component 258 then calculates likely words that complete the letter string entered thus far. For instance, if the user has typed "ins" the most likely completion of this prefix might be "insert". This is indicated by block 300 in FIG. 4 and is described in more detail below with respect to the example shown in FIG. 5.

In one embodiment, component 258 also receives the context 281 of application 252. For instance, the context will illustratively identify the particular application 252 for which a command is sought, and provide an indication of the particular contents of the window currently open and under focus in the application, a position of the cursor relative to the elements on the open window, etc. Examples of context 281 are described in greater detail below and the optional step of receiving the context is indicated by block 301 in FIG. 4.

Once the first letter is received, likely completions are calculated, and the context component 258 performs a search through command store 259 that stores the commands associated with a plurality of different applications. This search is performed based on the received letters, likely completions and the context. Performing the search is indicated by block 302 in FIG. 4.

In performing the search, component 258 identifies possible commands and calculates a score indicative of how likely it is that each of the possible commands is being requested by the user in the search request. This is indicated by block 304 in FIG. 4. While the search can be performed in any desired way, in one embodiment, the search is performed using a search engine that is trained with prior probabilities of commands.

Once the calculation has been made, component 258 returns the search results through interface 260 where they are displayed at user interface 271 through application 252. Of course, the results can be returned without going through application 252 as well. In any case, in one embodiment, component 258 not only displays the most likely commands given the search request, but also displays them in ranked order, given the score calculated for each command in block 204. Displaying the ranked commands is indicated by block 306 in FIG. 4.

User 254 can then either select one of the displayed commands, or continue typing additional letters in the search request. This is indicated by block 308 in FIG. 4. In the embodiment in which the user does not select one of the commands, but instead continues to type letters, processing reverts back to block 302 and another search is performed, scores are calculated, and the likely commands are again displayed in ranked order, as indicated by blocks 304 and 306.

Assume for the sake of the example shown in FIG. 5 that the user 254 wishes to insert a table in the particular application 252 which is open. In the embodiment shown in FIG. 5, user interface 271 shows that user 254 has typed into text box 274 the letters "ins". The context has also been provided to component 258. The context indicates, among other things, that the open application 252 is a presentation application. Component 258 calculates the probabilities of commands associated with the input "ins" stored in command store 259. In the particular example shown in FIG. 5, component 258 determines that the most probable completion of "ins" is "insert", and component 258 displays, as search results, commands which relate to inserting or adding in the given context.

It will be noted from this example that component 258 illustratively not only searches based upon the particular letters input, but based upon synonyms of the most likely completions of those letters. In other words, the most likely completion of the letters "ins" in the present context is "insert". Therefore, component 258 identifies synonyms for "insert" (such as "add") and searches for commands that are for "inserting" or "adding" things and that would be most likely, given the current context of the application 252.

As shown in FIG. 5, component 258 returns the search results, ranking them in order. It can be seen that the first command returned is "insert slide" which is more probable than any of the other commands in the list. The other commands in the list are rank ordered, according to the score calculated by component 258 (which can be a likelihood or probability or other desired measure) and they are numbered, according to their rank. In the embodiment shown in FIG. 5, the first nine results are number according to their rank, and a plurality of other commands are also provided, but are not numbered.

The user can select one of the commands from the list of returned results 275 by simply clicking on the displayed command. However, in one embodiment, the user can also select one of the numbered search results by simply typing that number in box 274. Any other desired way of selecting a command from the list 275 can be used as well.

In accordance with the example shown in FIG. 5, the user selects the "insert table" command. Having component 258 receive a command selection is indicated by block 308 in FIG. 4.

Once the user has selected a command from list 275, if more dialog with the user is required in order to further refine or disambiguate the command, component 258 can conduct that additional dialog. This is discussed in greater detail below with respect to FIG. 6. Determining whether the extra dialog is required and conducting that dialog is indicated by blocks 310 and 312 in FIG. 4.

Once the dialog is complete, or if no further dialog is required, that means that the selected command has been fully disambiguated by component 258. Component 258 can then either provide additional information to user 254 about the selected command (such as tutorial information), or component 258 can simply execute the command selected by the user. Providing the additional information is described in more detail below with respect to FIGS. 4A, 8 and 9, and executing the selected command is indicated by block 314 in FIG. 4.

As an example of executing the commands, where the user has selected the "insert table" command, component 258 (after it determines that no additional dialog is necessary) controls application 252 such that application 252 takes the user to the appropriate place in the application to execute the "insert table" command. FIG. 5 displays the appropriate user interface mechanism that allows the user to execute the "insert table" command.

As an example of conducting additional dialog to refine a command, component 258 may conduct a dialog with the user as at block 312 in FIG. 4 to determine the size of the table which the user wishes to add. Component 258 then adds it automatically. In another embodiment, component 258 simply allows the user to walk though the "insert table" functionality provided by application 252, once component 258 has taken the user to that place in the user interface provided by application 252.

Also, the additional dialog may further define what the user wishes to do. For example, if the user inputs "delete cell and table", the component 258 may respond with an inquiry such as "which table" or "which cell", and then delete the specified table or cell based on the response from the user.

In accordance with another embodiment, component 258 (or another component invoked by component 258) automatically performs the command selected by the user, receiving user inputs where necessary. For instance, user 254 can select the desired user interface elements to insert a table from the list 275 of possible commands. Component 258 (or another component invoked by component 258) can then assume control of application 252 and begin to automatically perform that command. However, when it comes to the point where the user interface asks the user to specify the size of the table (in terms of columns and rows) component 258 simply highlights the field to be modified by the user and pauses until the user has input the desired information and clicked "OK". In that example, component 258 (or other component) simply waits until the user has selected the desired number of columns and rows and clicked "OK" and component 258 (or other component) then walks the application 252 through the remainder of the steps necessary to perform the command of inserting the desired size table within the application, at the specified spot. Automatically executing the command is indicated by block 314 in FIG. 4.

Figure 6:
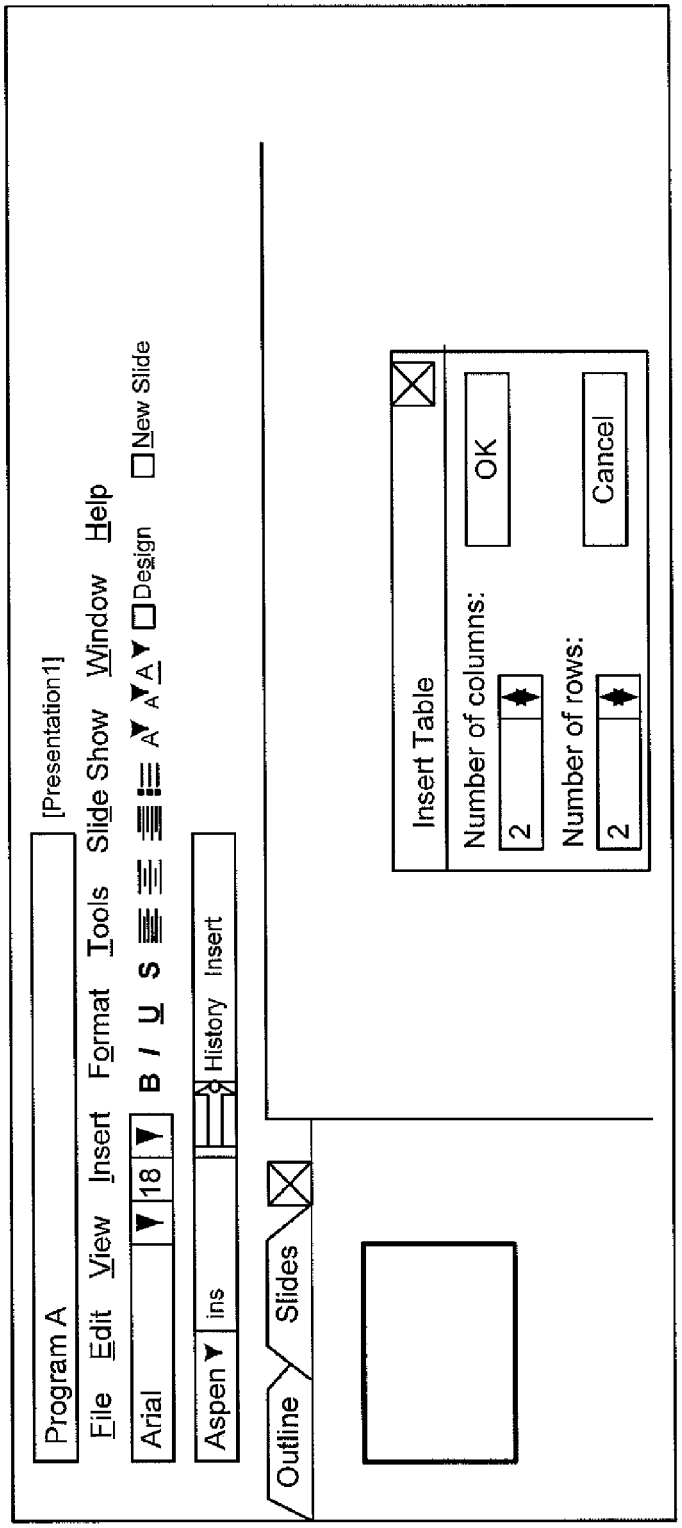
Figure 7:
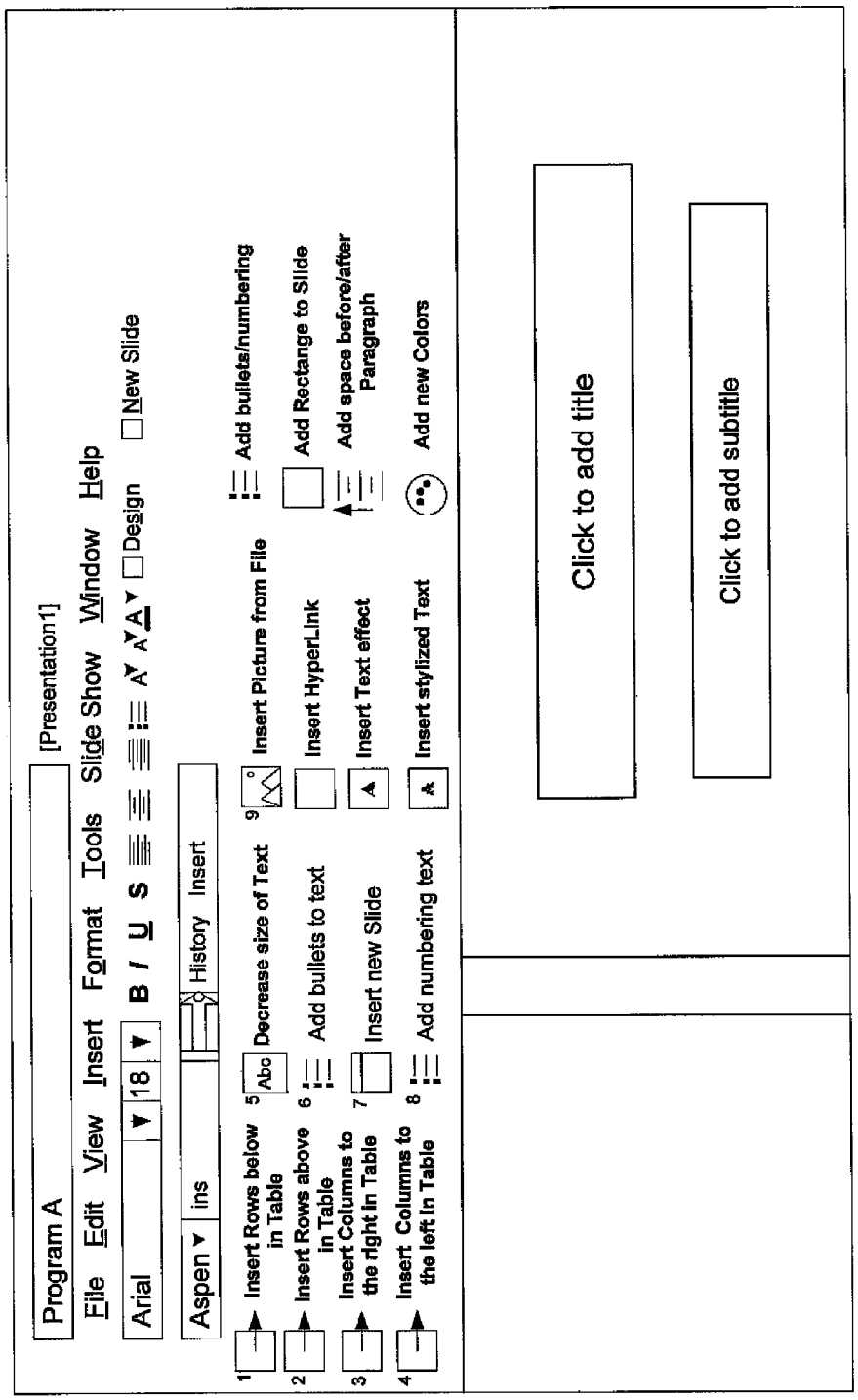

Of course, if component 258 is not configured to automatically execute the command selected by the user, the user can continue to use component 258 as the user is taking the steps to execute the command. For instance, if, in FIG. 6, the user again types "ins" into text box 274, component 258 again identifies the possible commands and calculates the scores for the various commands and again displays a list 275 of possible commands, given the new context. This is shown in FIG. 7. Specifically, FIG. 7 illustrates that component 258 has now calculated the highest scores for the commands of inserting rows and inserting columns in a table, because the context indicates that the table has already been added as shown in FIGS. 5 and 6.

As briefly mentioned above, component 258 can convey additional information to the user, and not just execute the command. This is indicated in FIG. 4A. For instance, component 258 may illustratively be configured to provide user 254 with tutorial information or guided help in executing the command. In doing so, component 258 first determines that it must convey this additional information (e.g., the guided help) to the user as indicated at block 400. The decision to provide the additional information can be predetermined by the developer, or set by the user using any desired user interface element, or based on any other desired criteria. Component 258 then retrieves and conveys the additional information, as indicated by block 402. In the embodiment discussed herein, the additional information is the guided help or tutorial help, which can be offered to a user in executing a command, and an example of this is illustrated in FIGS. 8 and 9.

Figure 8:
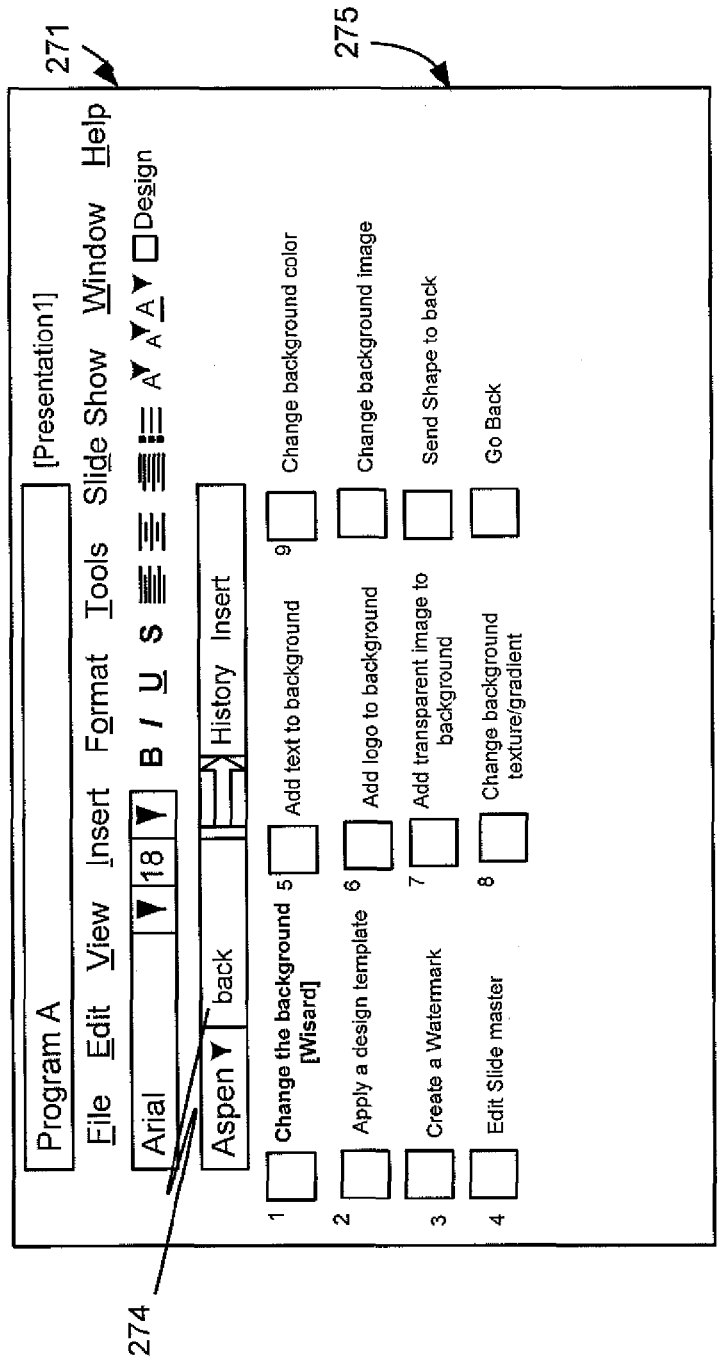

For instance, assume for the sake of example that the user types "back" in text box 274 as shown in FIG. 8. Component 258 then calculates the most probable commands, given the input "back" and given the present context and provides the ranked results shown in list 275. FIG. 8 also shows that the user has selected the first result in the list (i.e., the "change the background [wizard]" command). The selected command is actually comprised of a command bundle of subcommands that are executed to perform the overall command or task of changing the background. Component 258 then launches the "change background" command bundle associated with application 252. In the embodiment illustrated, one example of the guided help is shown in FIG. 9.

Figure 9:
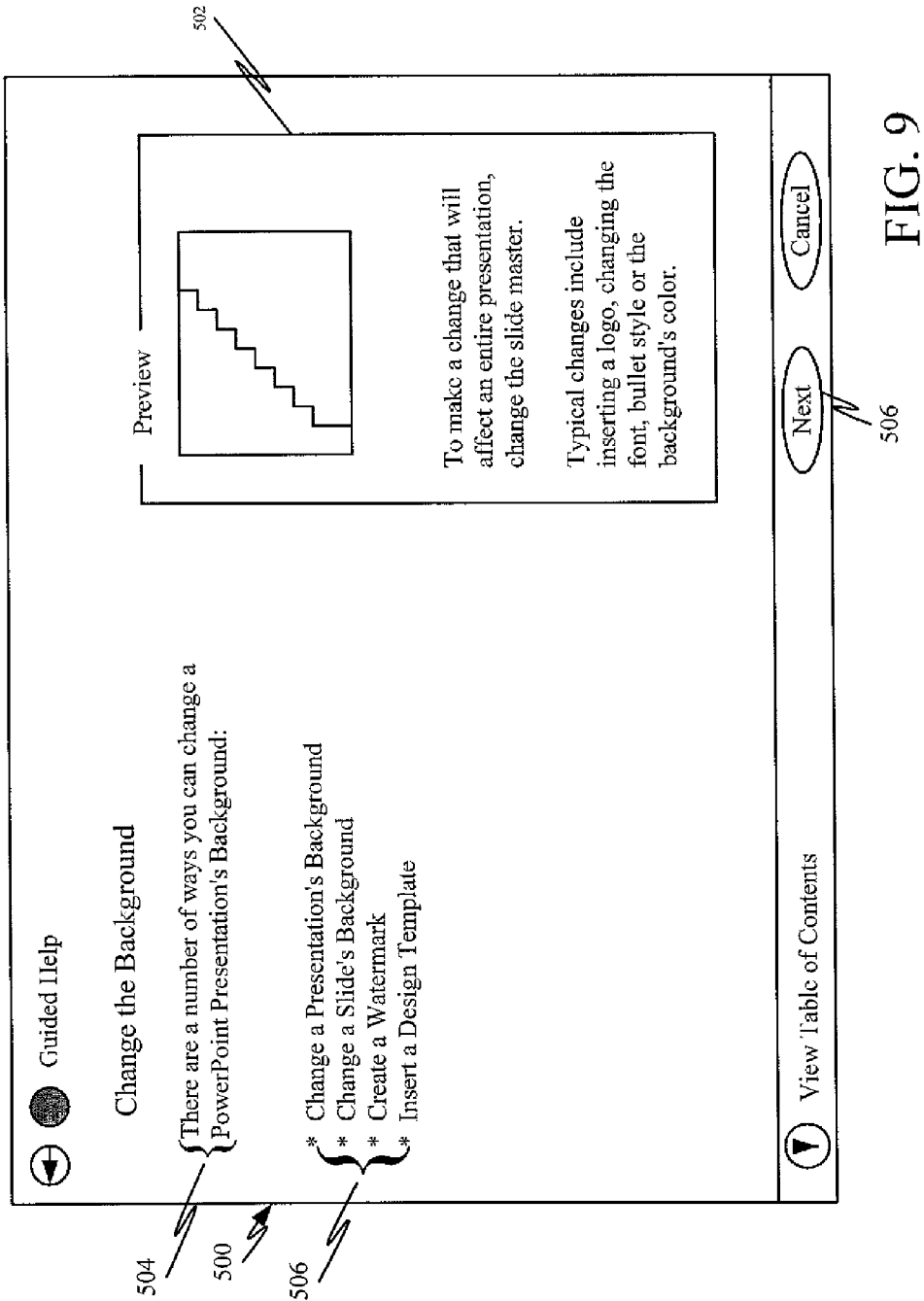

FIG. 9 is a guided help and command interface 500 which not only provides some tutorial information to the user about executing the selected command, but also provides mechanisms by which the user can actually execute the command. For instance, user interface 500 provides a tutorial display portion 502 that displays tutorial content, as well as a tutorial portion 504 that displays additional tutorial content. User interface 500 also provides command elements 506 that allow a user to select the desired subcommands, within the command bundle, for changing the background of presentation material provided in application 252. The "next" button 506 allows the user to walk through the tutorial and actually execute the command as the user is walking through the tutorial.

Figure 10A:
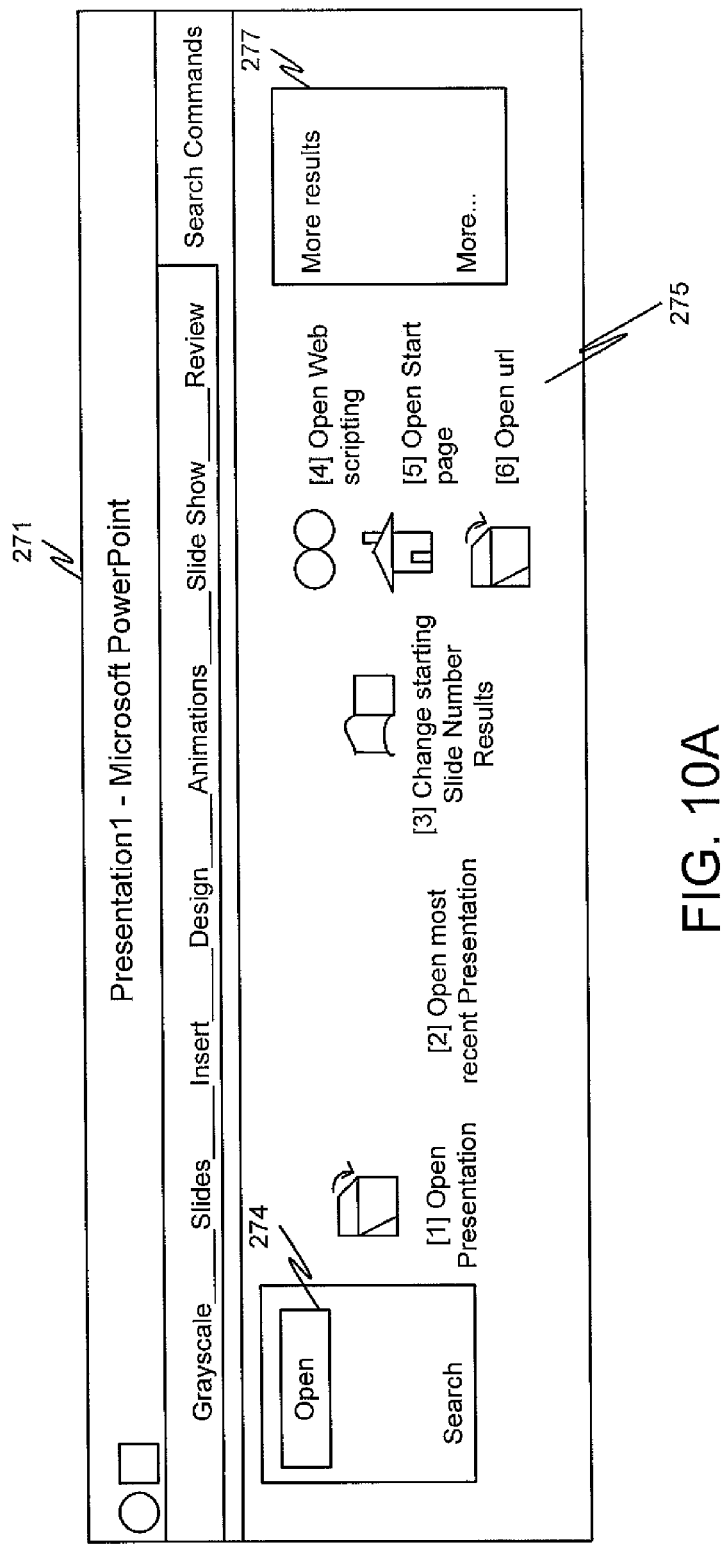

From the above discussion, it will be clear that the particular user interface 271 for conducting command searching can take a wide variety of different forms. For instance, FIG. 10A shows another embodiment of user interface 271. In the embodiment shown in FIG. 10A, the user has entered "open" in text box 274 and the possible commands are shown in list 275. The user can ask for additional results using elements 277.

Figure 10B:
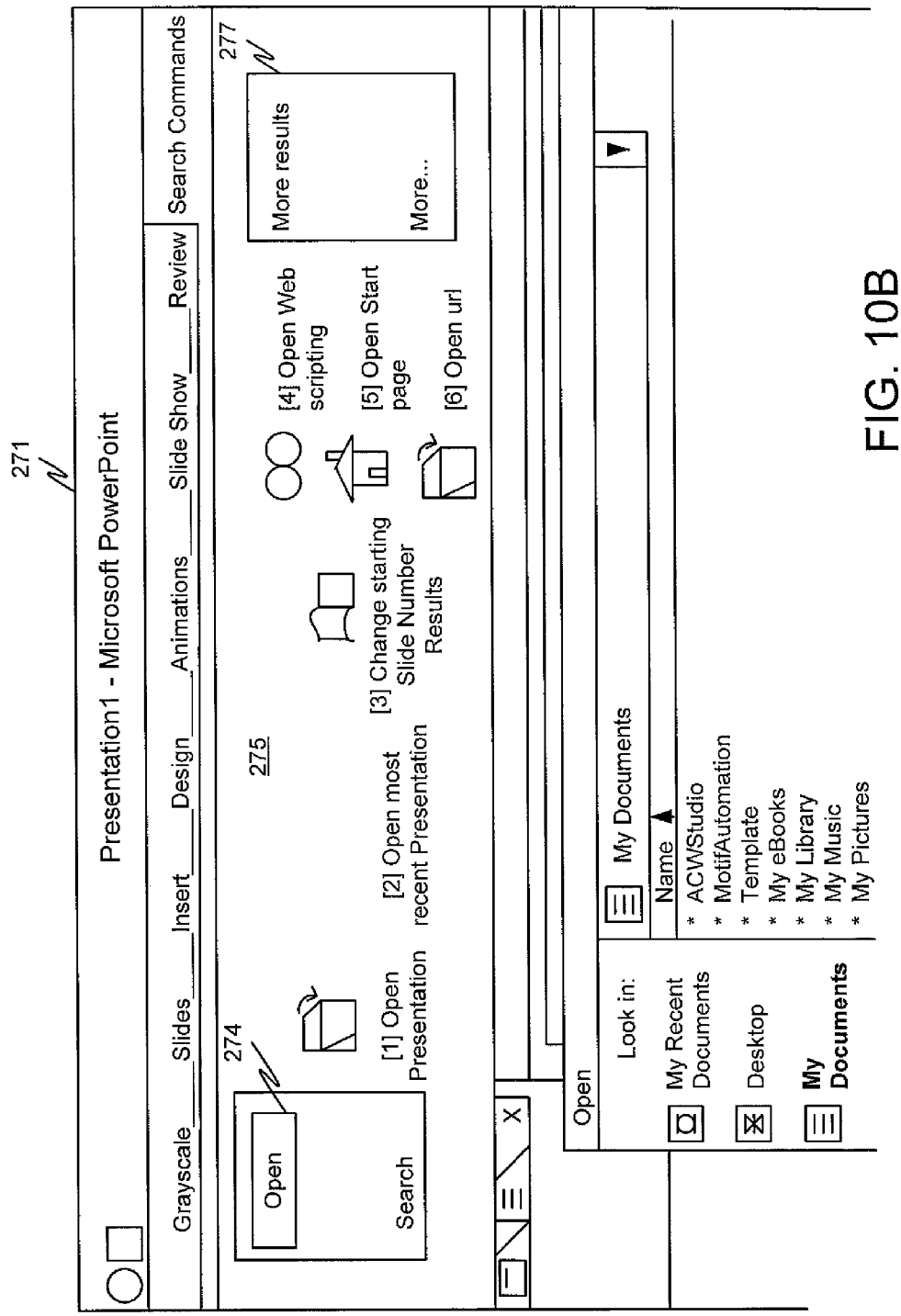

FIG. 10B shows an embodiment of user interface 271 after the user has selected the "open presentation" command. Component 258 then controls application 252 to bring up the "open" file dialog illustrated in FIG. 10B.

Figure 11:
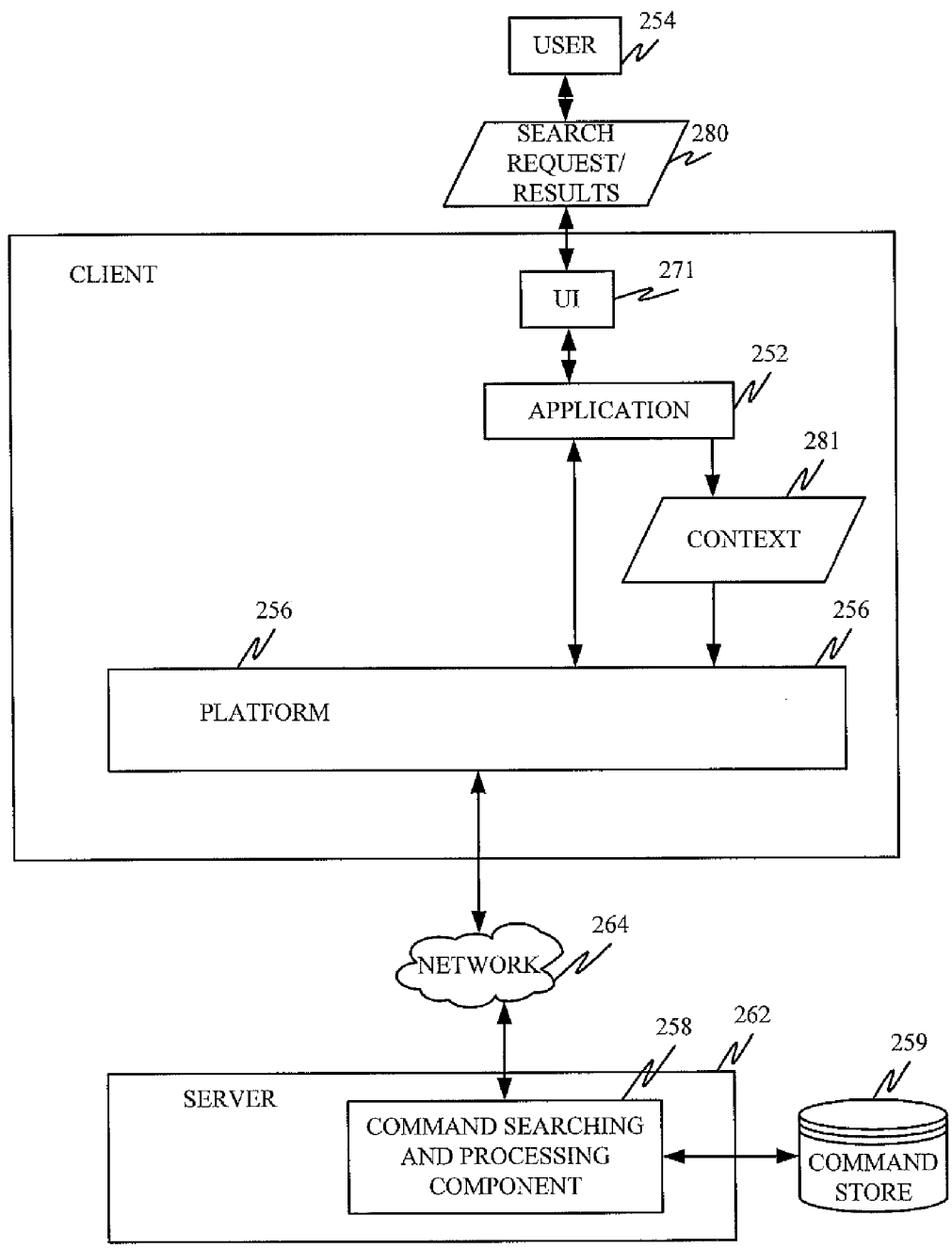
FIG. 11 is a diagrammatic representation of a system within which command searching and processing are performed on a server.
Figure 12:
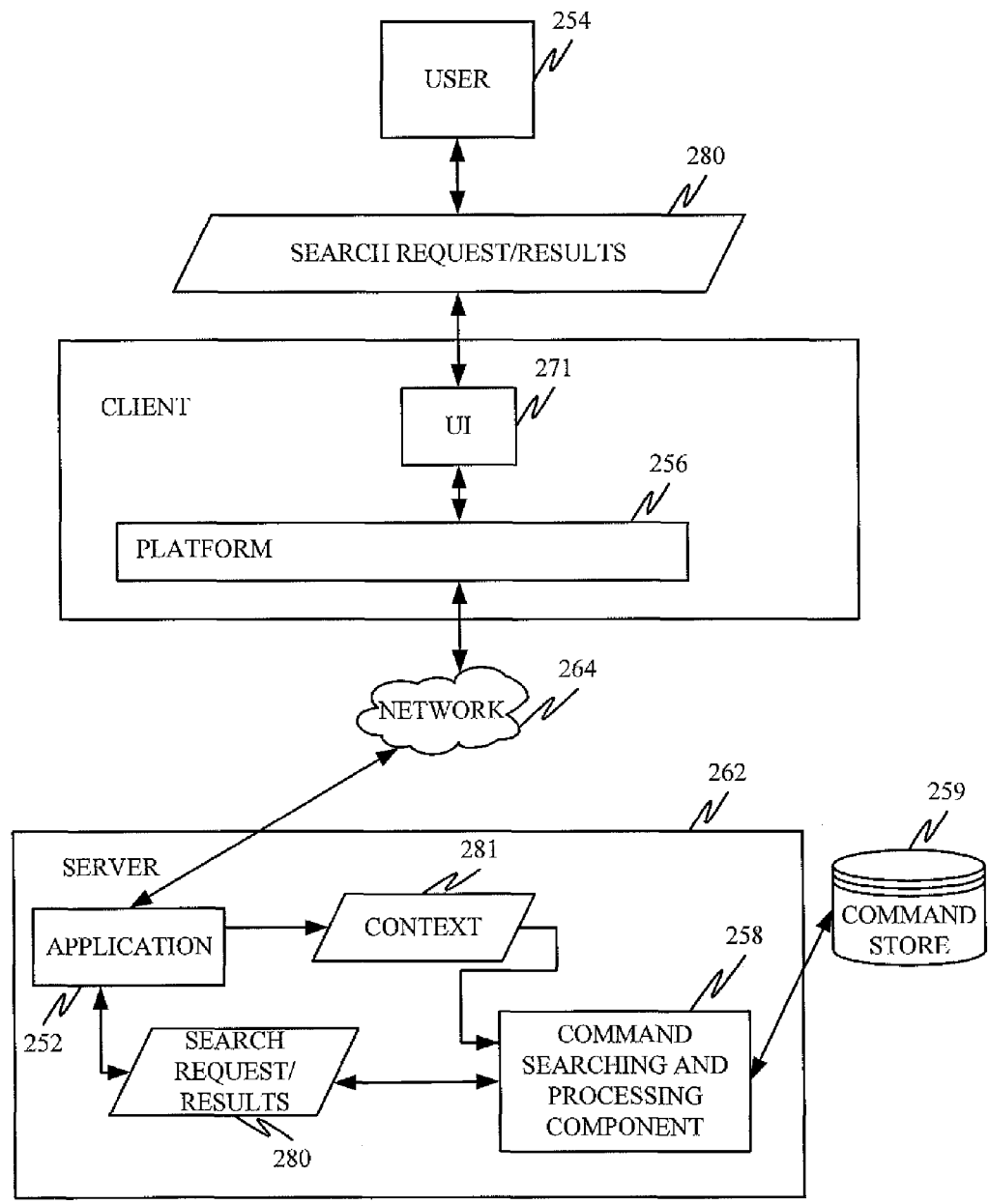
FIG. 12 is a diagrammatic representation of a system within which command searching and processing are performed on a server that supports a server-based application.

From the description thus far, it is clear that the command searching and processing component 258, and the subject matter related to it, are applicable not only to rich client applications (such as word processing applications, spreadsheets, presentation software, etc.) that reside on a client (such as a desktop or laptop computer) but that the subject matter is also applicable and useful, in an environment in which application 252 resides on a mobile device, such as a personal digital assistant, a mobile telephone, a handheld computer, etc. However, FIGS. 11 and 12 illustrate that the command searching and processing component 258, and the associated subject matter, are also useful in other environments. In one such environment, application 252 resides on a client, but command searching and processing component 258 resides remotely, such as on a server. In another such environment, application 252 and command searching and processing component 258 both reside remotely from the client such as on a server. Items in FIGS. 11 and 12 are numbered similarly to corresponding items in FIG. 3.

More specifically, FIG. 11 shows that command searching and processing component 258, and command store 259 are no longer resident on client 250. Instead, component 258 resides on server 262, and component 259 is shown coupled to component 258 and can reside at any desirable location. In the embodiment shown in FIG. 11, search request 280 and context 281 are provided through platform 256, over network 264, to component 258 on server 262. Component 258 performs the search, calculates the scores associated with the results, and provides the ranked search results back through network 264 and platform 256 to application 252, where they are provided to user 254 through user interface 271.

FIG. 12 is similar to FIG. 11, except that application 252 is now also located on server 262. Therefore, application 252 can be a web-based application which is accessed by client 250 over network 264. In the embodiment shown in FIG. 12, the request and search results are transmitted back and forth between application 252 and component 258 at server 262.

It can thus be seen that the present system uses language to find substantially any command that a user wishes to execute in an application. The user can provide a search request in the user's own language, and the present system illustratively maps that language to the correct command by searching based on prior probabilities, given context. The commands that are returned are likely the most relevant ones for a given search request, in the current context. Commands returned, once selected, can be automatically performed for the user, or a user interface can be brought up based on the selected command, a wizard can be launched, a rich wizard can be launched, or a tutorial can be run based on the selected commands.

It should also be noted that the present system pivots functionality of the application around the particular command that the user wishes to execute. For instance, if the user wishes to find all commands in the system that have to do with printing, it may be difficult in conventional systems to find those specific commands, because printing commands are often located in various different user interface locations. However, the present component 258 can be used to gather all of that information into a single place, in response to a search request for a printing-related command.

Figure 13:
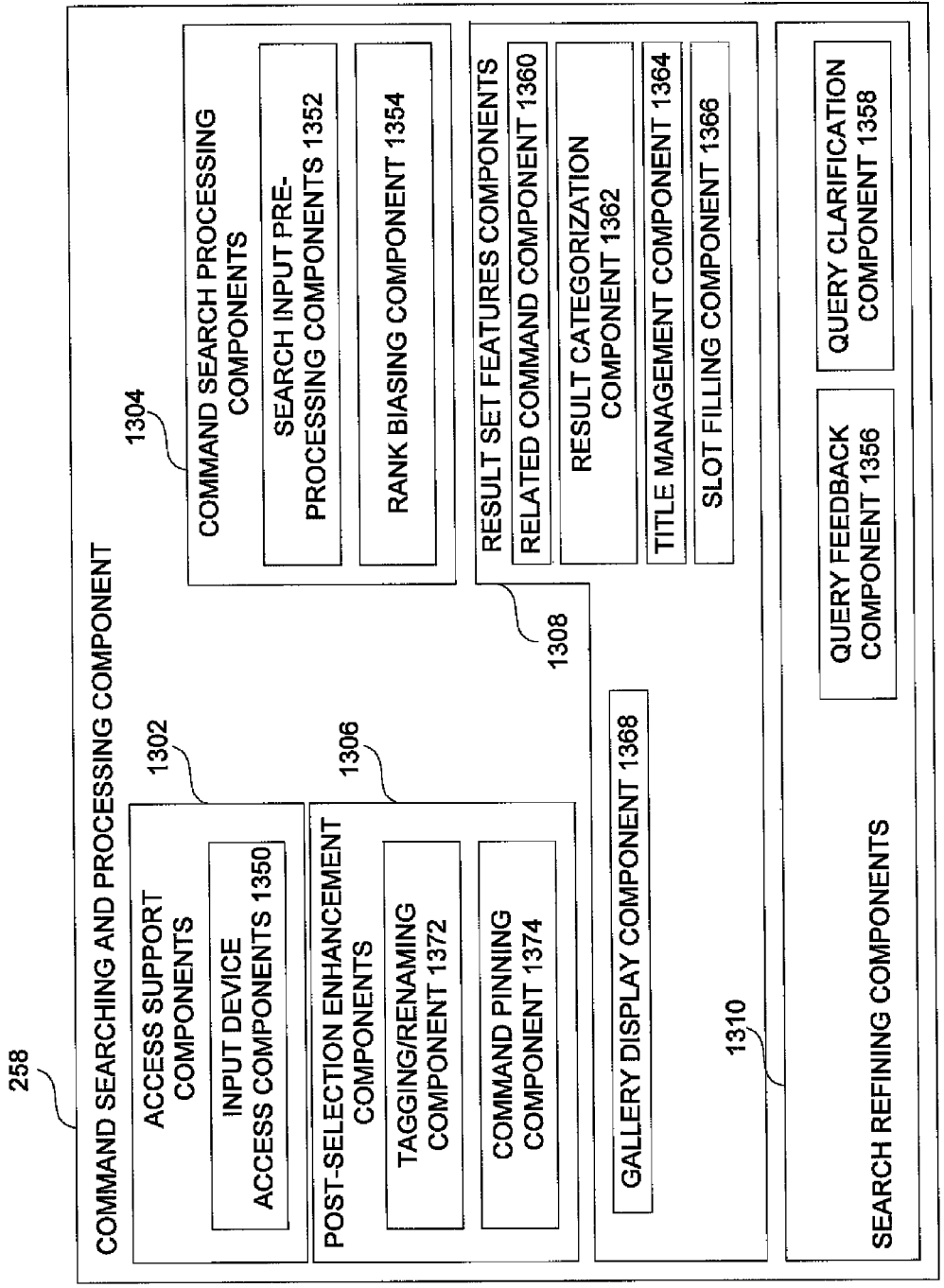
FIG. 13 is a schematic illustration of an exemplary command searching and processing component.

A variety of specialized features can be incorporated into the described command searching systems and methods. FIG. 13 is a schematic illustration of a command searching and processing component 258. FIG. 13 shows component 258 comprising a variety of different individual components for supporting specialized features. The specialized features are illustratively categorized into access support components 1302, command search processing components 1304, post-selection enhancement components 1306, result set features components 1308 and search refining components 1310. Those skilled in the art will appreciate that all of the specialized components illustrated in FIG. 13 are illustratively optional enhancements that may or may not be included in a given implementation. Further, the illustrated specialized components need not necessarily be implemented from within command searching and processing component 258. The illustrated implementation is but one example of how implementation can be accomplished.

Figure 14A:
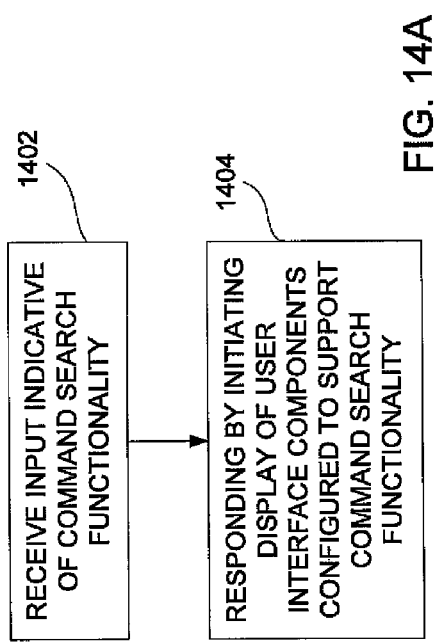
FIGS. 14A and 14B are flowcharts demonstrating functionality associated with an implementation of an input device access component.

Access support components 1302 include input device access components 1350. FIG. 14A is a flowchart demonstrating functionality associated with one implementation of an input device access component 1350. In accordance with step 1402, a user input is received and is indicative of command search functionality. In accordance with step 1404, the received input is responded to by initiating display of user interface components configured to support command search functionality. In one embodiment, a key on a keyboard (or a combination of keystrokes) is configured to, upon actuation by a user, initiate display of a user interface component configured for command searching. In one embodiment, the displayed component is a floating user interface that enables a user to search for commands and then disappears after the command is executed. It should be noted that the present invention is not limited to keyboard-initiated access to command searching components. User-initiated inputs from other input devices (e.g., a mouse, a voice-activated command, etc.) can illustratively be configured to initiate a command searching process. Those skilled in the art will understand that inputs from most devices can be mapped to various functions, which in the present case includes the command searching functionality.

Figure 14B:
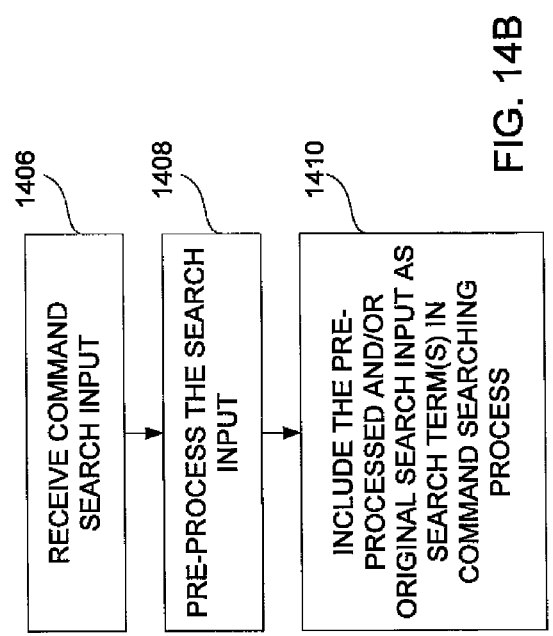

Command search processing components 1304 include search input pre-processing components 1352. FIG. 14B is a flowchart demonstrating one implementation of a search input pre-processing component 1352. In accordance with step 1406, a command search input is received. In accordance with step 1408, the search input is pre-processed in some manner. Finally, in accordance with step 1410, the pre-processed and/or original search input is included as search terms in the command searching process. In one embodiment of the pre-processing step, the received command search input (e.g., the words typed into the search query area) is evaluated and expanded so that the command search will match additional command results. Command search inputs can illustratively be expanded utilizing a variety of techniques such as, but not limited to, synonym generation, morphological transformation of query terms (e.g., stemming, etc.), spelling correction, generating functionally equivalent terms, etc.

Figure 14D:
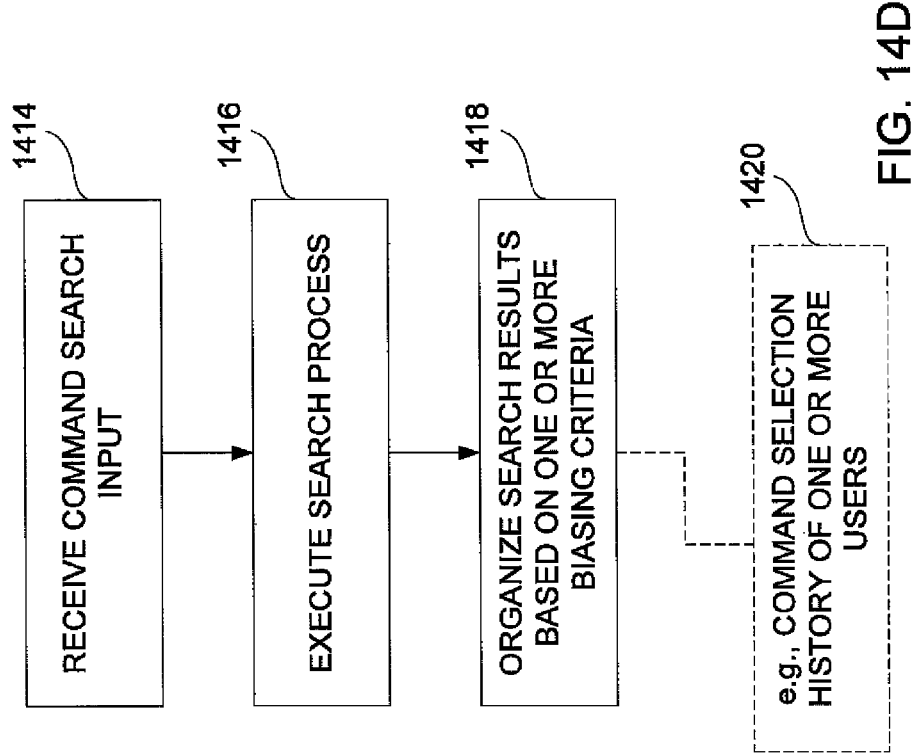
FIG. 14D is a flowchart demonstrating steps associated with one implementation of a rank biasing component.
Figure 14C:
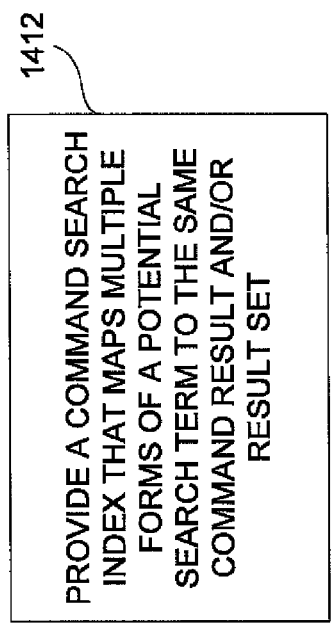
FIG. 14C is a flowchart demonstrating a method for providing a command search index that maps multiple forms of a potential search term to the same command result.
Figure 15A:
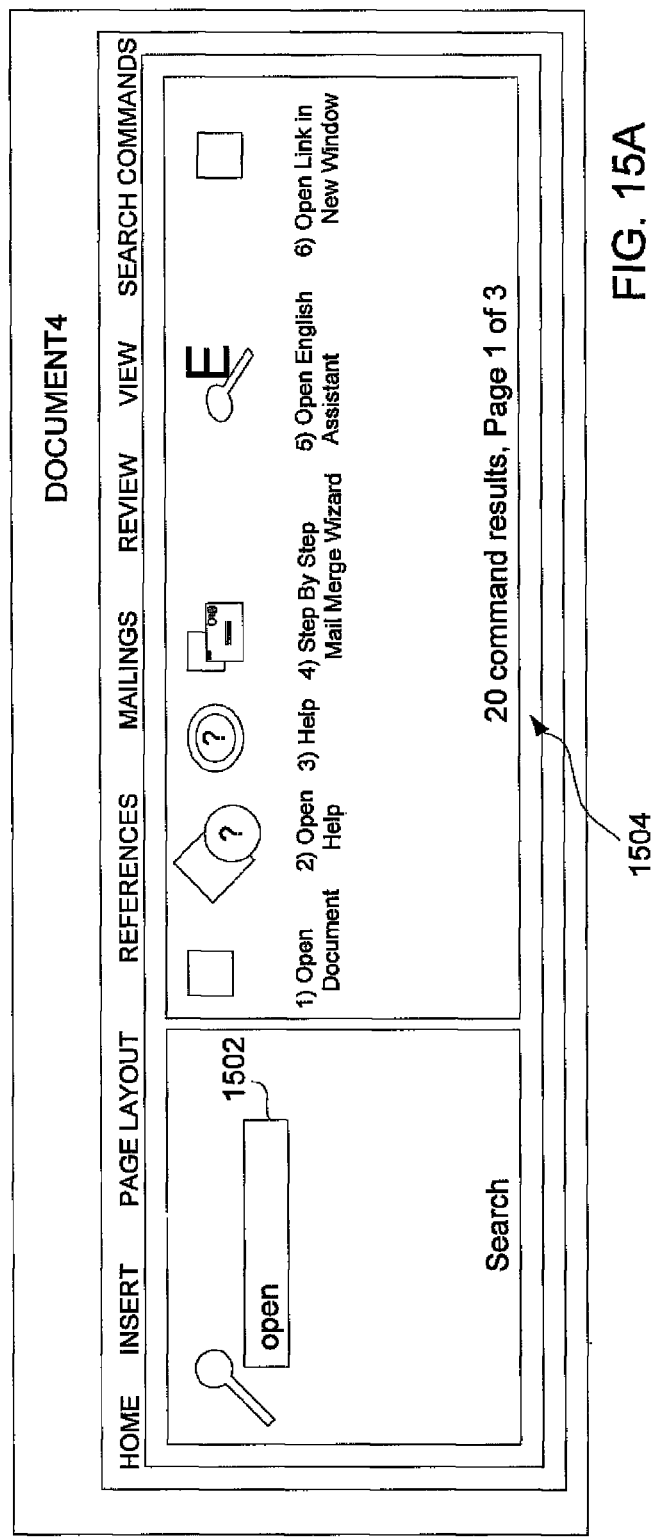
Figure 15B:
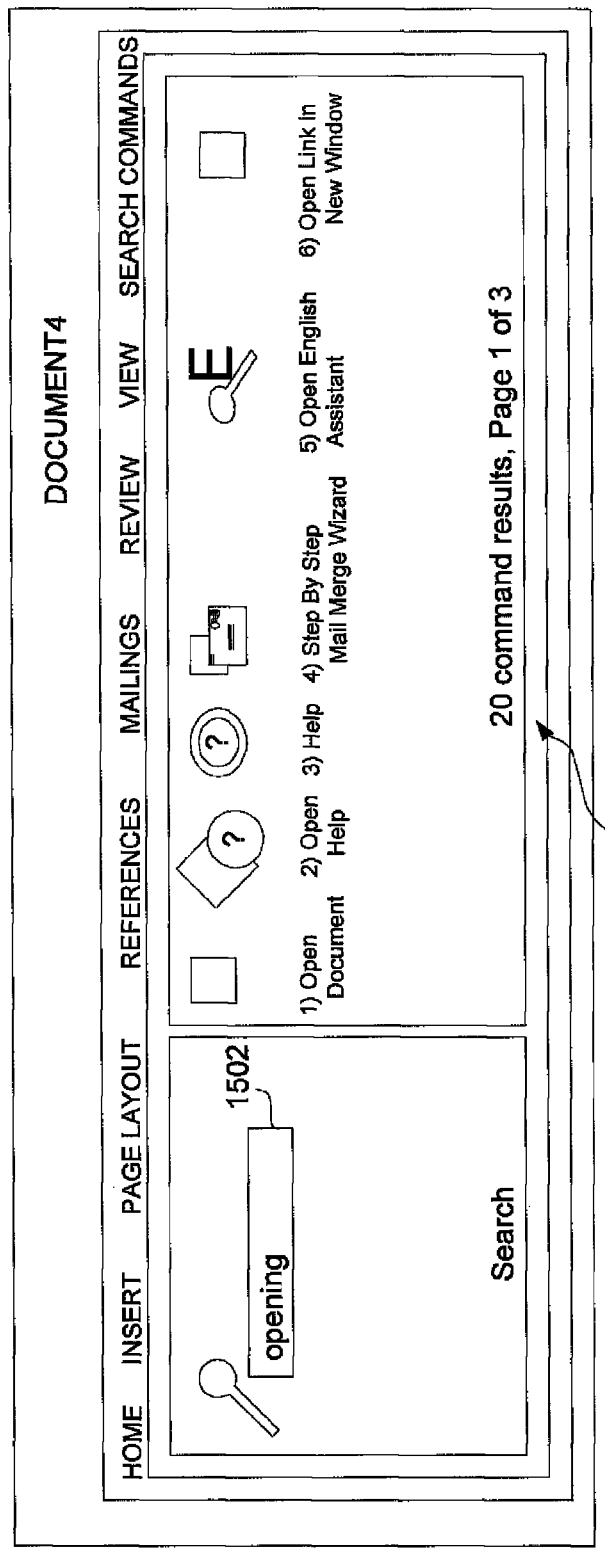

It should be pointed out that query expansion and other pre-processing are not the only ways to enable a broader and/or more accurate set of command results. FIG. 14C illustrates a method of providing a command search index that maps multiple forms of a potential search term to the same command result. An example of this is illustrated in the partial screenshots 15A and 15B. Each of these screenshots shows a set of command search results 1504 that were illustratively returned in response to an execution of a command search utilizing a search term shown in box 1502. In FIG. 15A, the search term was "open". In FIG. 15B, the search term was "opening". Notably, the result set 1504 is the same in both instances. This outcome is illustratively supported by the search input pre-processing components 1352 such as, but not limited to, the methods demonstrated in FIGS. 14B and 14C.

Command search processing components 1304 illustratively include a rank biasing component 1354. FIG. 14D is a flowchart demonstrating steps associated with one implementation of a rank biasing component 1354. In accordance with step 1414, a command search input is received. In accordance with step 1416, a search process is executed based on the received command search input. As is shown in the user interface of FIG. 5, command search results can illustratively be ranked within the output display. In accordance with step 1418, the search results are organized in the output display based on one or more biasing criteria. As is demonstrated by block 1420, one example of a biasing criteria is the command selection history of one or more users. For example, commands that are more frequently utilized by the user that initiated the same (or similar) search can be configured to be more likely to appear higher in the ranking. In addition or alternatively, commands frequently used by many users in general (e.g., users of the same computing device upon which the search is being initiated and/or users of other computing devices) can be configured for bias toward ranking higher. Those skilled in the art will appreciate that ranking determinations can be configured to account for a variety of different factors including but not limited to quality of a match, command selection history, etc.

Search refining components 1310 include query feedback component 1356. FIG. 14E is a flowchart demonstrating one implementation of a query feedback component 1356. In accordance with step 1422, a command search input is received. In accordance with step 1424, based on the command search input, alternate related queries are determined and presented to the user. In accordance with step 1426, a selection of one of the alternate queries is received. Finally, in accordance with block 1428, a command search is executed based on the selected alternate query. In one embodiment, the alternate queries are simply related optional queries or queries that may, predictably, simply be of interest to the user (i.e., determined based on one or more characteristics of their input query). In one embodiment, the alternate queries are options from which the user can choose to expand or narrow the scope of their search. In one embodiment, the alternate queries are queries that have proven (e.g., based on an object criteria such as click patterns, etc.) to be useful to one or more users that have made the same or similar query. Alternate queries can be implemented as described for any purpose without departing from the scope of the present invention.

Figure 14G:
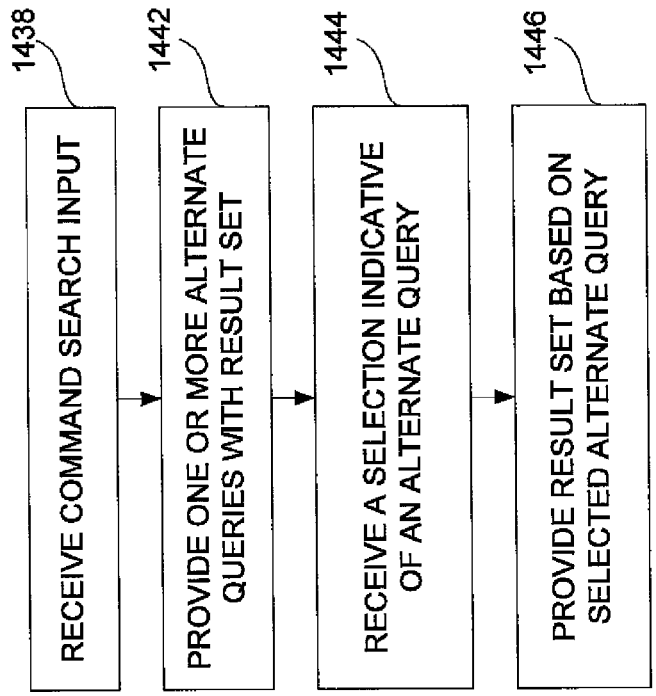
FIG. 14G is a flowchart demonstrating one implementation of a related query component.
Figure 14F:
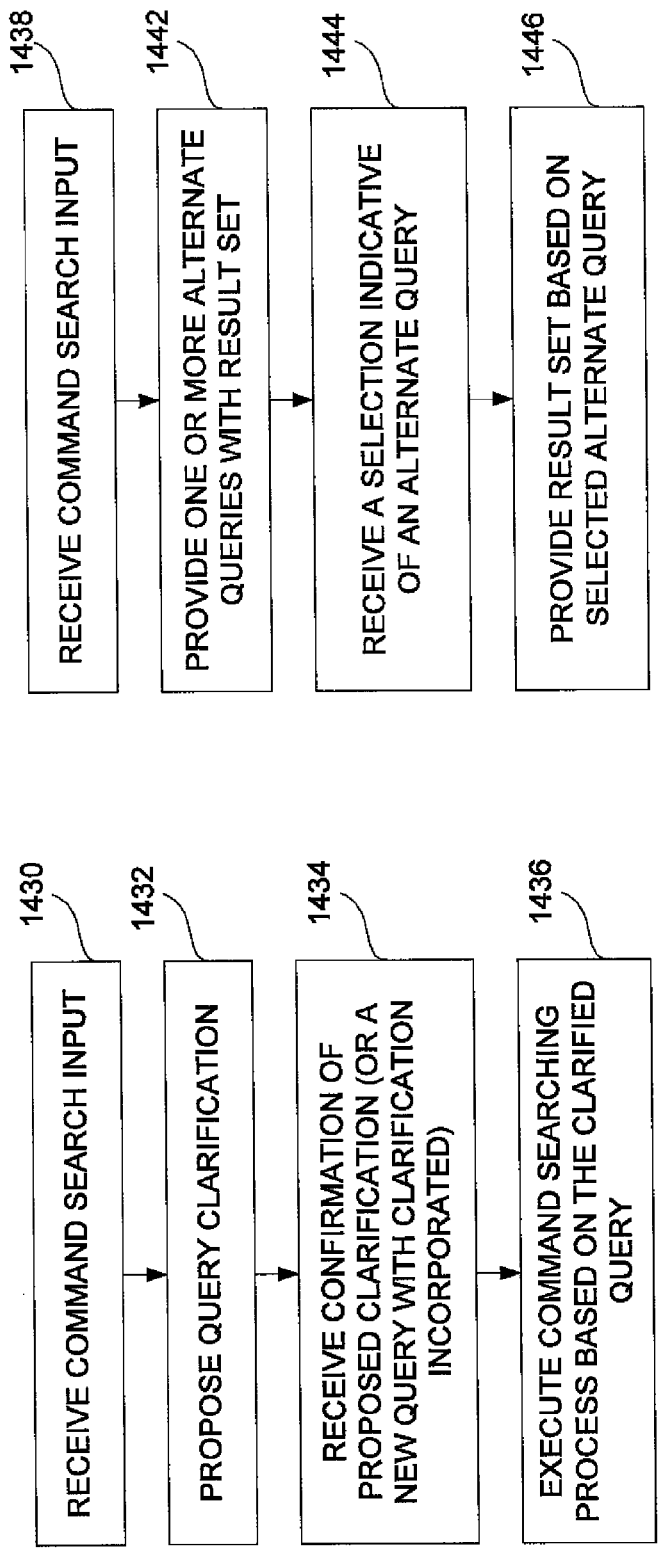
FIG. 14F is a flowchart demonstrating one implementation of a query clarification component.

Search refining components 1310 include query clarification component 1358. FIG. 14F is a flowchart demonstrating one implementation of a query clarification component 1358. In accordance with step 1430, a command search input is received. In accordance with step 1432, based on the command search input, the user is presented with a proposed clarification of the input query. In accordance with step 1434, an input is received from the user in the form of either a conformation of the proposed clarification or a new query that is a version of the first entered query revised to incorporate the proposed clarification. Finally, in accordance with block 1436, a command search is executed based on the clarified query (i.e., based on the first entered query modified either by the user or by the system to reflect the proposed clarification.

Figure 16:
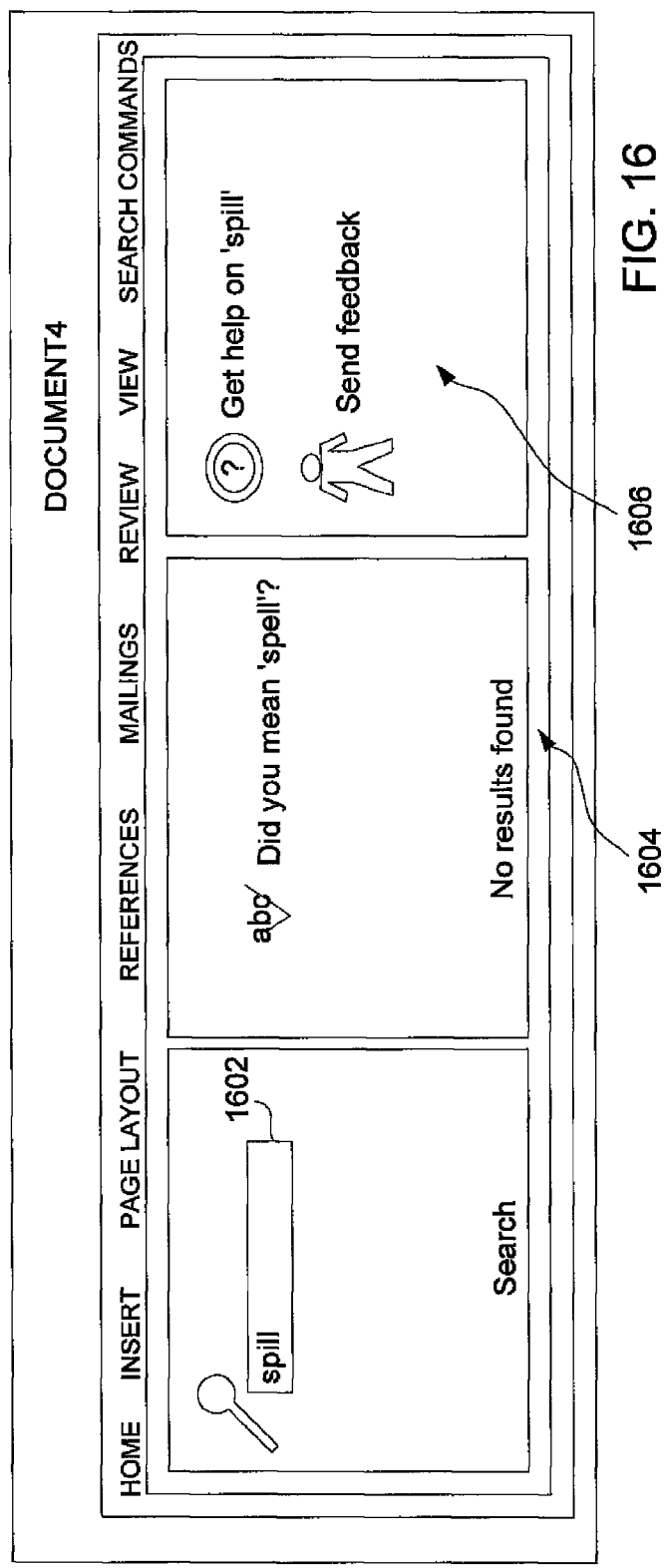

An example of this is illustrated in the partial screenshot of FIG. 16. This screenshot shows a user interface illustratively returned in response to an execution of a command search utilizing a search term shown in box 1602. In FIG. 16, the search term was "spill." In response, a proposed query clarification is presented in panel 1604, namely, the system asks the user whether the intended query was for "spell" instead of "spill." In one embodiment, not by limitation, proposed clarifications are made only when no results (or results believed, based on an object criteria, to be an unlikely fit for the user's expectations) are identified based on the query input by the user. However, this need not necessarily be the case.

As is shown in panel 1606, in addition to presenting a proposed clarified query, the user can be presented with a help option and/or an option for providing specific or general feedback about the command search system. In one embodiment, feedback provided by the user is utilized as a basis for modification of the command search system used by the user providing the feedback and/or similar search systems utilized by others (e.g., the user provides feedback indicating that the term "spill" should be linked to a particular command . . . subsequently, the user's system and/or the system of another is updated to include the link). It is to be understood that the help and feedback features shown in panel 1606 are not limited to being presented to the user in the context of query clarification. For example, the features of panel 1606 can be presented with any query result set, or otherwise presented to the user.

It should be noted that while the example provided in FIG. 16 is related to query clarification the form of a spelling correction this is but one example of a query clarification. Those skilled in the art will appreciate that the present invention is not so limited.

Result set features components 1308 include related command component 1360. FIG. 14G is a flowchart demonstrating one implementation of a related query component 1360. In accordance with step 1438, a command search input is received. In accordance with step 1442, based on the command search input, a result set (i.e., corresponding to the received search input) is provided along with one or more alternate queries. In accordance with step 1444, a selection indicative of an alternate query is received. Finally, in accordance with step 1446, another result set is provided but this time the result set is based on the selected alternate query.

In one embodiment, the alternate queries provided in accordance with step 1442 are simply related optional queries or queries that may, predictably, simply be of interest to the user (i.e., determined based on one or more characteristics of their input query). In one embodiment, the alternate queries are options from which the user can choose to expand or narrow the scope of their search. In one embodiment, the alternate queries are queries that have proven (e.g., based on an object criteria such as click patterns, etc.) to be useful to one or more users that have made the same or similar query. Alternate queries can be implemented as described for any purpose without departing from the scope of the present invention.

Figure 14I:
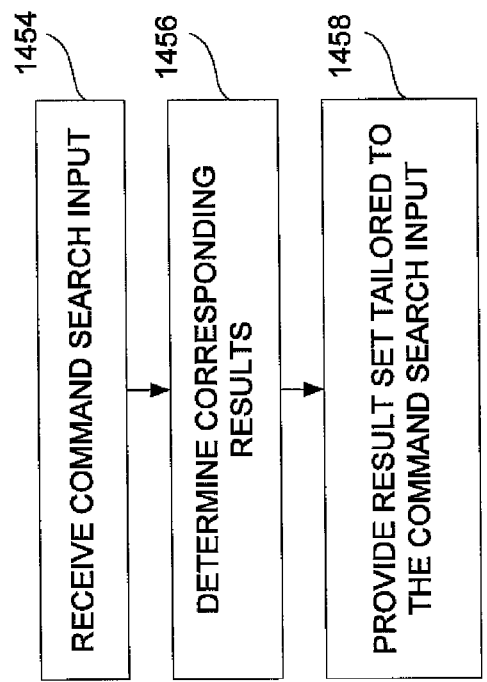
FIG. 14I is a flowchart demonstrating one implementation of a title management component.
Figure 14H:
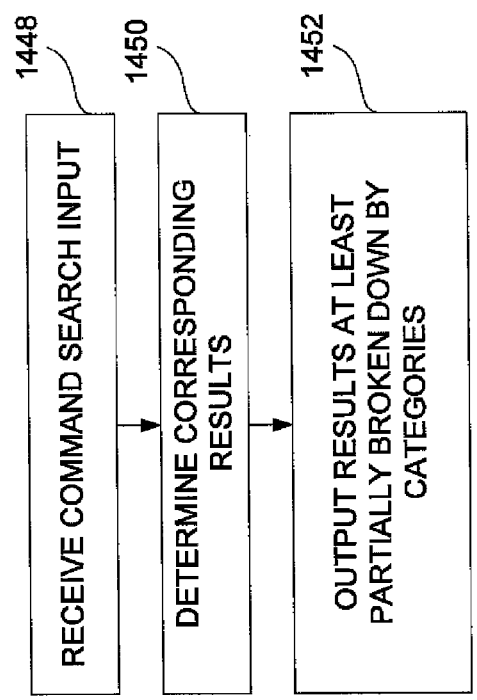
FIG. 14H is a flowchart demonstrating one implementation of a result categorization component.

Result set features components 1362 include result categorization component 1362. FIG. 14H is a flowchart demonstrating one implementation of a result categorization component 1362. In accordance with step 1448, a command search input is received. In accordance with step 1450, based on the command search input, search results are determined (i.e., corresponding to the received search input). In accordance with step 1452, the search results are output to the user at least partially broken down by category. For example, results related to controls for adjusting text characteristics are identified (i.e., in a user interface component) as being associated with a first category, while control for adjusting display functions are associated with a second category. Not all search results need necessarily be identified with a category.

Result set features components 1308 include title management component 1364. FIG. 14I is a flowchart demonstrating one implementation of a title management component 1364. In accordance with step 1454, a command search input is received. In accordance with step 1456, based on the command search input, a result set (i.e., corresponding to the received search input) is determined. In accordance with step 1458, the result set is output to the user in a format that is customized to match the received command search input. For example, terminology utilized in the user input is incorporated into one or more titles output in connection with the search results.

An example of this is illustrated in the partial screenshots 17A and 17B. Each of these screenshots shows a set of command search results 1704 that were illustratively returned in response to an execution of a command search utilizing a search term shown in box 1702. In FIG. 17A, the search term was "portrait". In FIG. 17B, the search term was "landscape". Notably, the result set 1704 includes the same command results but the titles in each instance have been altered to reflect the terminology incorporated into the respective box 1702.

Unrelated to title management component 1364, it is worth pointing out that FIGS. 17A and 17B include a navigation panel 1710. Within panel 1710 are "previous" and "next" buttons that enable the user to navigate through search results in panel 1704 when not all the results are simultaneously displayed.

Figure 14J:
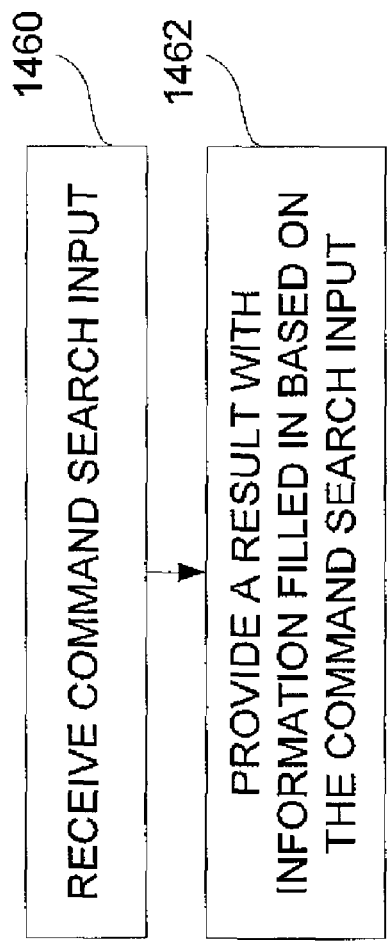
FIG. 14J is a flowchart demonstrating one implementation of a slot filling component 1366.
Figure 18:
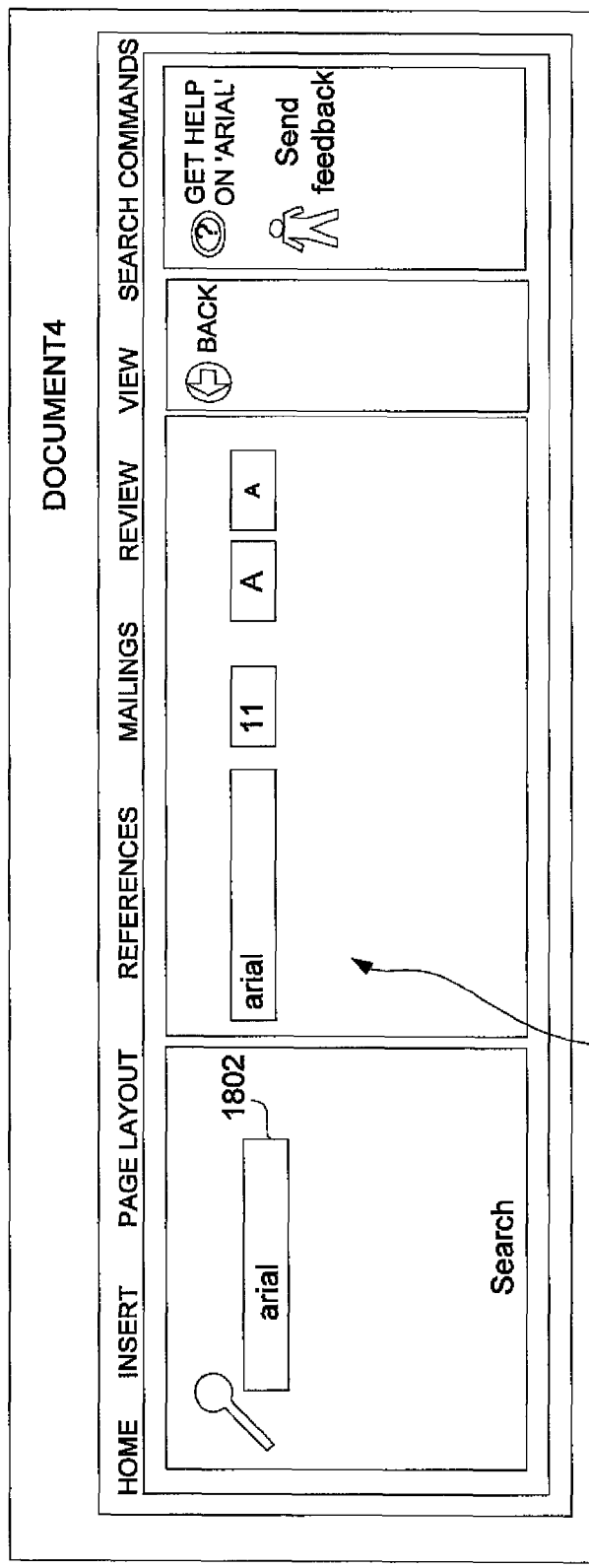

Result set features components 1308 include slot filling component 1364. FIG. 14J is a flowchart demonstrating one implementation of a slot filling component 1366. In accordance with step 1460, a command search input is received. In accordance with step 1462, based on the command search input, the user is presented with a result having control item filled in based on information in the received search input. An example of this is illustrated in the partial screenshot of FIG. 18. This screenshot shows a user interface illustratively returned in response to an execution of a command search utilizing a search term shown in box 1802. In FIG. 18, the search term was "arial." In response, a font control menu 1804 is provided with information from the input query (i.e., "arial") automatically filled in. This is but one of many potential examples of how slot filling functionality can be implemented.

It should be noted that the present invention is not limited to filling in a combo box as illustrated in FIG. 18. Other types of controls can be automatically manipulated as described without departing from the scope of the present invention. Also, it is part of the present invention to return a control menu in response to a command search. That being said, the present invention is not limited to returning a font control menu as shown in FIG. 18. Other control menus can be returned (e.g., in response to different queries) without departing from the scope of the present invention.

Figure 19:
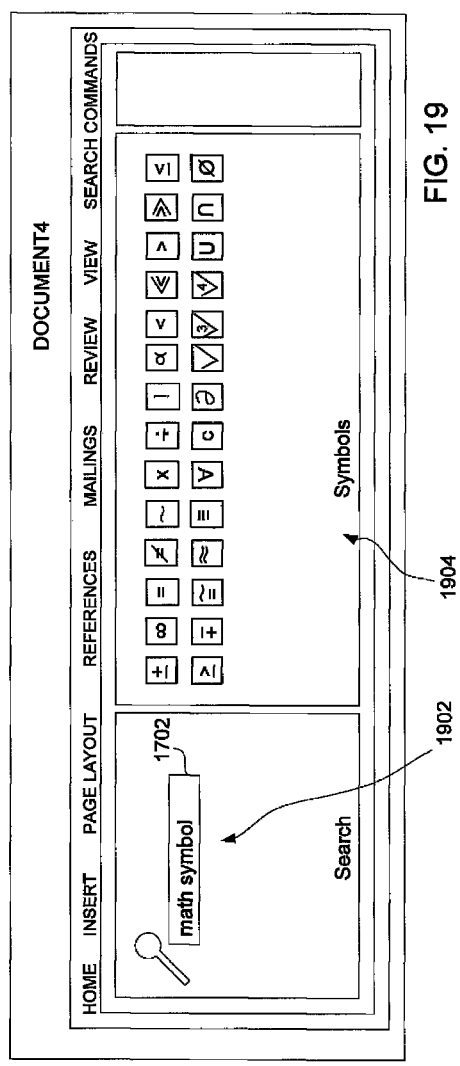

Result set features components 1308 include gallery display component 1368. FIG. 14K is a flowchart demonstrating one implementation of a gallery display component 1368. In accordance with step 1464, a command search input is received. In accordance with step 1466, based on the command search input, the user is presented with a result set in a gallery format. An example of this is illustrated in the partial screenshot of FIG. 19. This screenshot shows a user interface illustratively returned in response to an execution of a command search utilizing a search term shown in box 1902. In FIG. 19, the search term was "math symbol." In response, a math symbol gallery 1904 is provided. Optional buttons 1906 enable the user to scroll through the gallery (i.e., these button are implemented when fewer than all symbols can be simultaneously displayed).

FIG. 19 is but one of many potential examples of how a gallery display functionality can be implemented in a result set. The present invention is not limited to returning a match symbol gallery as shown. Other galleries can be returned (e.g., in response to different queries) without departing from the scope of the present invention.

Result set features components 1308 include data provider component 1370. FIG. 14L is a flowchart demonstrating one implementation of a data provider component 1366. In accordance with step 1468, a command search input is received. In accordance with step 1470, the command search input is analyzed and a request for data is identified. In accordance with step 1472, the requested data is provided as part of search results displayed to the user in response to the query input. In one example of the method of FIG. 14L, a user inputs "show application version." The system analyzes this query and identifies the fact that the user is looking for information. In response, the system provides the requested version information in the area where command search results are typically displayed. The information may or may not be displayed with search results that also match the query input. This is but one example of an implementation of the command search functionality to enable a user to request and receive information.

Post-selection enhancement components 1306 include tagging/renaming component 1372. FIG. 14M is a flowchart demonstrating one implementation of a tagging/renaming component 1372. In accordance with step 1474, a tag or name is received in relation to a command. In accordance with step 1476, system parameters are adjusted such that the command will implement functionality related to the received command or tag. In one embodiment, in this manner, a user is able to rename a command (e.g., a command identified by the system as "spelling" can be renamed to "spell checking"). In another embodiment, in this manner, a user is able to attach a tag to a command (e.g., a user can add a term that will impact when the command will be considered matching a given query). It is to be understood that the present invention extends to attaching tags or renaming for any reason.

Post-selection enhancement components 1306 include command pinning component 1374. FIG. 14N is a flowchart demonstrating one implementation of a command pinning component 1374. In accordance with step 1478, a request to pin is received in relation to a command. In accordance with step 1480, the system is adjusted as necessary to respond to the request to pin the identified command. In one embodiment, in this manner, a user is able to add a command from the search result list to a menu, toolbar, quick access toolbar, etc. In one embodiment, in this manner, a user can "click and drag" a command from the search result list so as to create a separate user interface component in a different location, the separate user interface component being linked to the associated command functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
receiving a user input indicative of a task to be performed by a user in an application;
generating a command query that includes a search term based on the user input;
accessing a command store that stores indications of executable commands associated with the application;
identifying, using a computer processor, a set of executable commands based on the search term and the indications in the command store, wherein each executable command in the set of executable commands corresponds to a different task in the application;
generating a user interface that displays the set of executable commands in a user selectable form such that each executable command in the set can be selected by the user for execution to perform the corresponding task;
receiving an indication of user selection of one of the executable commands in the set of executable commands displayed on the user interface; and
automatically executing the selected command that performs the task, corresponding to the selected command, in the application.

2. The method of claim 1, further comprising:
receiving an input indicative of a user desire to display a command search user interface component;
responding to the input by displaying the command search user interface component in the user interface; and
receiving the user input in the command search user interface component.

3. The method of claim 2, wherein the set of executable commands is displayed within the command search user interface component.

4. The method of claim 2, further comprising:
receiving an additional user input; and
terminating display of the command search user interface component in response to the additional user input.

5. The method of claim 1, further comprising pre-processing the user input to identify an additional search term that is included in the command query, the additional search term being based on the user input but not explicitly defined by the user input.

6. The method of claim 1, further comprising:
accessing a command search index that maps multiple forms of a potential command query to a same set of executable commands in the command store; and
identifying the set of executable commands based on the command search index.

7. The method of claim 1, wherein generating the user interface comprises:
identifying a plurality of executable commands returned from the command store based on the search term;
ranking the plurality of executable commands based on a biasing criterion; and
displaying the plurality of executable commands in the user interface based on the ranking.

8. The method of claim 1, further comprising:
processing the command query to identify an alternate command query that is based on, but different from, the command query;
displaying the alternate command query to the user;
receiving a user selection of the alternative command query; and
identifying the set of executable commands based on the alternative command query.

9. The method of claim 1, further comprising:
processing the command query to identify a proposed query modification;
displaying the proposed query modification to the user;
receiving a user selection of the proposed query modification;
based on the user selection, modifying the command query based on the proposed query modification; and
identifying the set of executable commands based on the modified command query.

10. The method of claim 1, wherein the user input includes the search term.

11. The method of claim 1, wherein identifying a set of executable commands comprises:
searching the command store using a search engine that is trained with prior probabilities of commands.

12. The method of claim 1, and further comprising:
identifying a characteristic of the command query; and
formatting the display one of the executable commands so as to be consistent with the characteristic of the command query.

13. A computing system comprising:
a processor; and
memory storing instructions executable by the at least one processor, wherein the instructions configure the computing system to:
identify a command search request that includes a search term indicative of a task to be performed in an application;
identify an application context indicative of the application for which the task is to be performed;
identify a plurality of commands based on the command search request and the application context, each command having a corresponding task in the application;
generate a user interface display comprising user interface elements that visually represent the commands and are visually arranged on the user interface display based on command categories, each user interface element being selectable to execute the task, corresponding to the command represented by the user interface element, within the application;

receive an indication of a user selection input;

based on the indication of the user selection input, select a user interface element from the user interface elements on the user interface display; and automatically execute the task corresponding to the command represented by the selected user interface element.

14. The computing system of claim 13, wherein a particular one of the user interface elements represents at least one of the commands and has a rendered appearance that is selected based at least in part on an attribute of the search request.

15. The computing system of claim 13, wherein the instructions configure the computing system to:

receive a task user input indicative of the desired task; and identify the search term based on the task user input.

16. The computing system of claim 15, wherein the instructions configure the computing system to:

enhance the command search request by identifying an additional search term that is based on the search term but not explicitly defined by the user task input.

17. A computer-implemented method comprising:

receiving a command search request that includes a search term indicative of a task to be performed in an application;

searching a data store, using a computer processor, to identify a plurality of commands based on the command search request; and generating a user interface that displays the plurality of commands as graphical user interface elements, visually ordered on the user interface so as to account for at least one rank biasing factor indicative of the command selection history of one or more users, wherein each graphical user interface element is user-actuatable to perform a task corresponding to the command represented by the graphical user interface element;

receiving an indication of a user input that actuates a particular one of the graphical user interface elements; and automatically performing the task corresponding to the command represented by the particular graphical user interface element.

18. The computer-implemented method of claim 17, wherein the rank biasing factor is indicative of when commands in the list were most recently selected.

19. The computer-implemented method of claim 17, wherein the rank biasing factor is a data item indicative of a period of, or point in, time.

20. The computer-implemented method of claim 17, wherein the rank biasing factor is indicative of a log of user activity.

* * * * *